US012269633B2

(12) United States Patent
Cardadeiro et al.

(10) Patent No.: US 12,269,633 B2
(45) Date of Patent: Apr. 8, 2025

(54) PACKAGING APPARATUS

(71) Applicant: PACKAGING AUTOMATION LIMITED, Knutsford (GB)

(72) Inventors: Rui Carlos Miguel Cardadeiro, Knutsford (GB); David Ian Woolrich, Knutsford (GB)

(73) Assignee: PACKAGING AUTOMATION LIMITED (GB)

( * ) Notice: Subject to any disclaimer, the term of this patent is extended or adjusted under 35 U.S.C. 154(b) by 82 days.

(21) Appl. No.: 18/007,098

(22) PCT Filed: Jul. 28, 2021

(86) PCT No.: PCT/GB2021/051942
§ 371 (c)(1),
(2) Date: Jan. 27, 2023

(87) PCT Pub. No.: WO2022/023741
PCT Pub. Date: Feb. 3, 2022

(65) Prior Publication Data
US 2023/0242292 A1 Aug. 3, 2023

(30) Foreign Application Priority Data

Jul. 28, 2020 (EP) .................................... 20188249
Jul. 28, 2020 (EP) .................................... 20188254

(51) Int. Cl.
*B65B 35/24* (2006.01)
*B65B 35/44* (2006.01)
(Continued)

(52) U.S. Cl.
CPC ............ *B65B 35/243* (2013.01); *B65B 35/24* (2013.01); *B65B 35/44* (2013.01); *B65G 47/082* (2013.01);
(Continued)

(58) Field of Classification Search
CPC ....... B65B 35/243; B65B 35/24; B65B 35/44; B65B 35/30; B65B 43/46; B65B 35/36;
(Continued)

(56) References Cited

U.S. PATENT DOCUMENTS 4,283,245 A * 8/1981 Benoit .................... B65C 9/065
156/DIG. 27
5,860,270 A 1/1999 Gerwe
(Continued)

FOREIGN PATENT DOCUMENTS

DE 102014103632 A1 * 9/2015 ............. B65G 47/32
GB 2517145 A * 2/2015 ............. B65B 35/36
(Continued)

OTHER PUBLICATIONS

International Search Report issued for relating International Patent Application No. PCT/GB2021/051941 on Oct. 6, 2021.
(Continued)

*Primary Examiner* — Gene O Crawford
*Assistant Examiner* — Muhammad Awais
(74) *Attorney, Agent, or Firm* — Shumaker, Loop & Kendrick, LLP; Jonathan M. Hines

(57) ABSTRACT

A packaging apparatus and method is provided. The packaging apparatus comprises: a support platform for supporting packaging containers positioned thereon; and a packaging container positioning apparatus for positioning packaging containers on the support platform. The packaging container positioning apparatus comprises: one or more rails that each form a path for conveying devices; a plurality of individually controllable conveying devices comprising at least a first conveying device and a second conveying device, each conveying device mounted on a rail for moving along the path; and a control system configured to control the conveying devices. The control system is configured to
(Continued)

control each conveying device to engage: a packaging container, move along the path in a first conveying direction, and release the packaging container, to position the packaging container on the support platform.

12 Claims, 15 Drawing Sheets

(51) Int. Cl.
    *B65G 47/08*      (2006.01)
    *B65G 47/31*      (2006.01)

(52) U.S. Cl.
    CPC ...... *B65G 47/31* (2013.01); *B65G 2201/0235* (2013.01)

(58) Field of Classification Search
    CPC ...... B65B 35/16; B65G 47/082; B65G 47/31; B65G 25/02; B65G 2201/0235; B65G 17/323; B65G 47/847; B65G 17/26; B65G 17/32; B65G 21/2072; B65G 21/22; B65G 47/08
    USPC ....................................... 198/418.7
    See application file for complete search history.

(56) References Cited

U.S. PATENT DOCUMENTS

| | | | | |
|---|---|---|---|---|
| 9,873,571 | B2 * | 1/2018 | Hahn | .............. B65G 47/082 |
| 10,196,164 | B2 * | 2/2019 | Nakamoto | ........... B65G 47/842 |
| 2008/0289930 | A1 * | 11/2008 | Fischer | ............... B65G 47/086 |
| | | | | 198/348 |
| 2011/0072764 | A1 | 3/2011 | Daniek et al. | |
| 2011/0150610 | A1 * | 6/2011 | Weber | ................ B25J 11/0045 |
| | | | | 414/226.01 |
| 2014/0374217 | A1 | 12/2014 | Buchenberg | |
| 2015/0321857 | A1 * | 11/2015 | Sacchetti | ............. B65G 47/845 |
| | | | | 198/419.2 |
| 2018/0155134 | A1 * | 6/2018 | Heuft | .................... B65G 15/12 |
| 2018/0246042 | A1 * | 8/2018 | Piana | ................ B65G 47/2445 |
| 2019/0233152 | A1 * | 8/2019 | Nakamoto | ............ B65B 51/32 |

FOREIGN PATENT DOCUMENTS

| | | | | |
|---|---|---|---|---|
| JP | S62285817 | | 12/1987 | |
| JP | S62285817 A | * | 12/1987 | |
| WO | 9723386 | | 7/1997 | |
| WO | 2011154744 | | 12/2011 | |
| WO | 2016174270 | | 11/2016 | |
| WO | WO-2019179685 A1 | * | 9/2019 | ............. B25J 9/003 |

OTHER PUBLICATIONS

International Search Report issued for relating International Patent Application No. PCT/GB2021/051942 on Oct. 5, 2021.

European Search Report issued for relating European Patent Application 20188254.5 on Dec. 11, 2020.

European Search Report issued for relating European Patent Application 20188249.5 on Dec. 14, 2020.

* cited by examiner

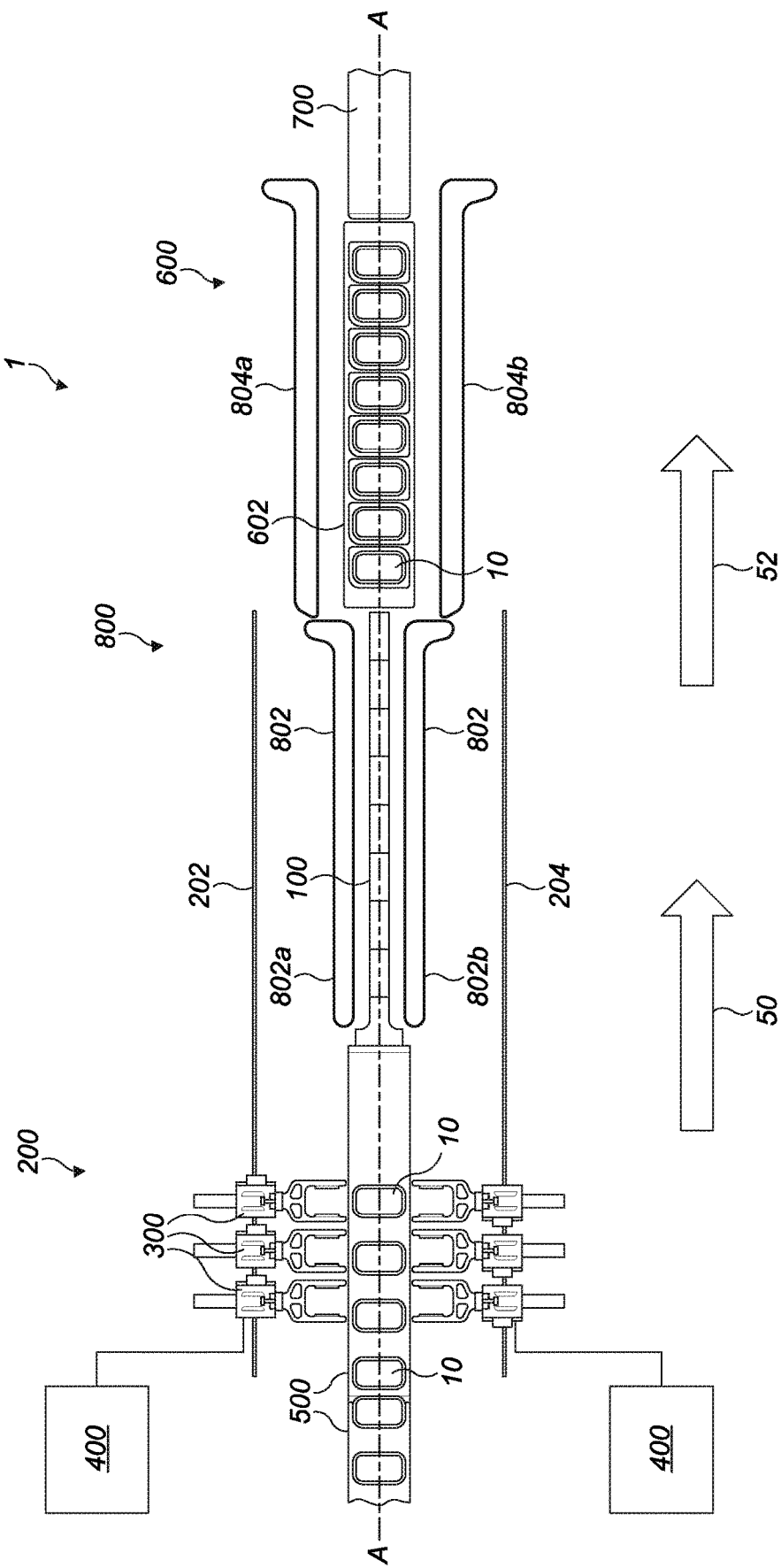
FIG. 1.1

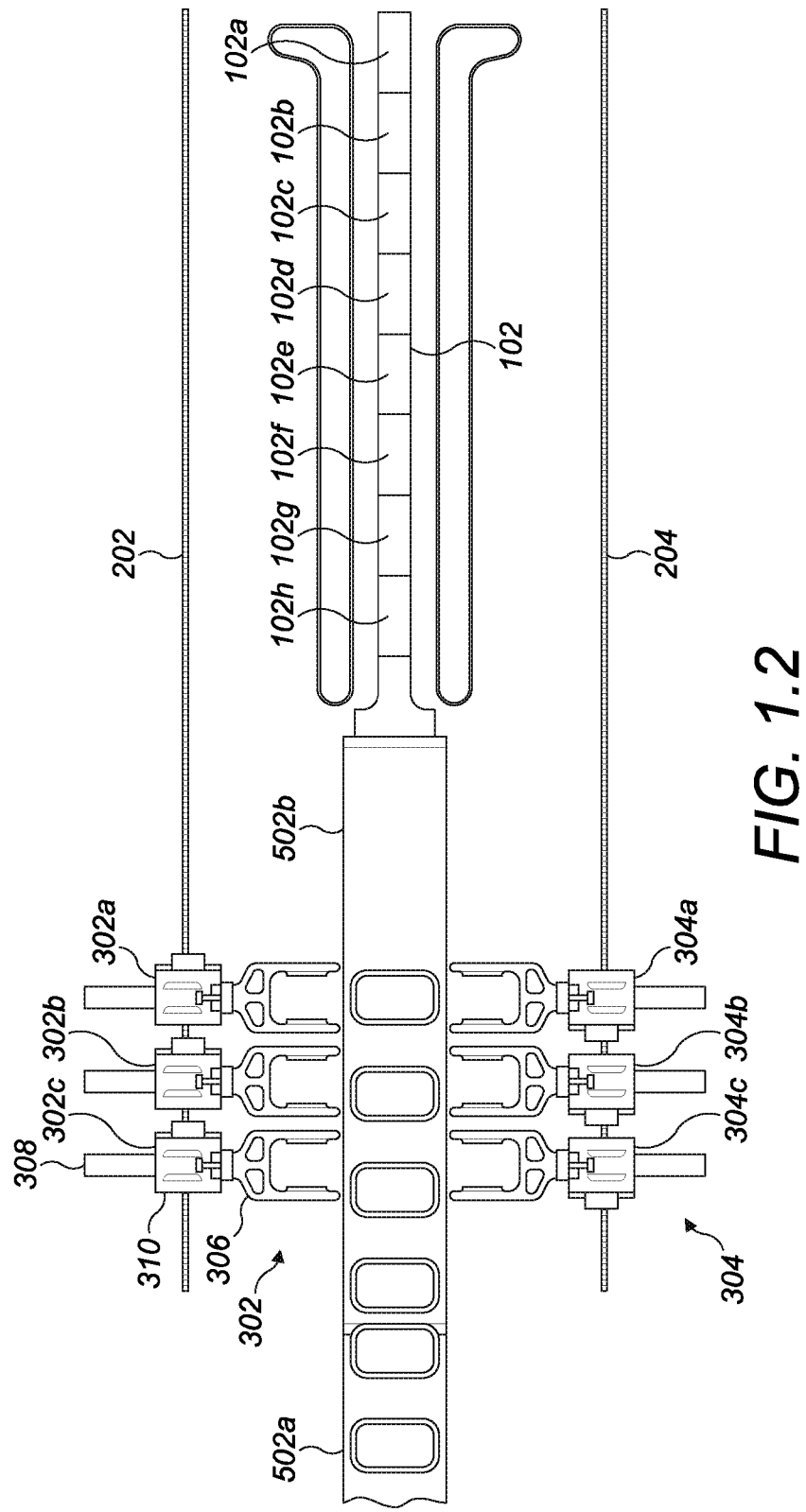
FIG. 1.2

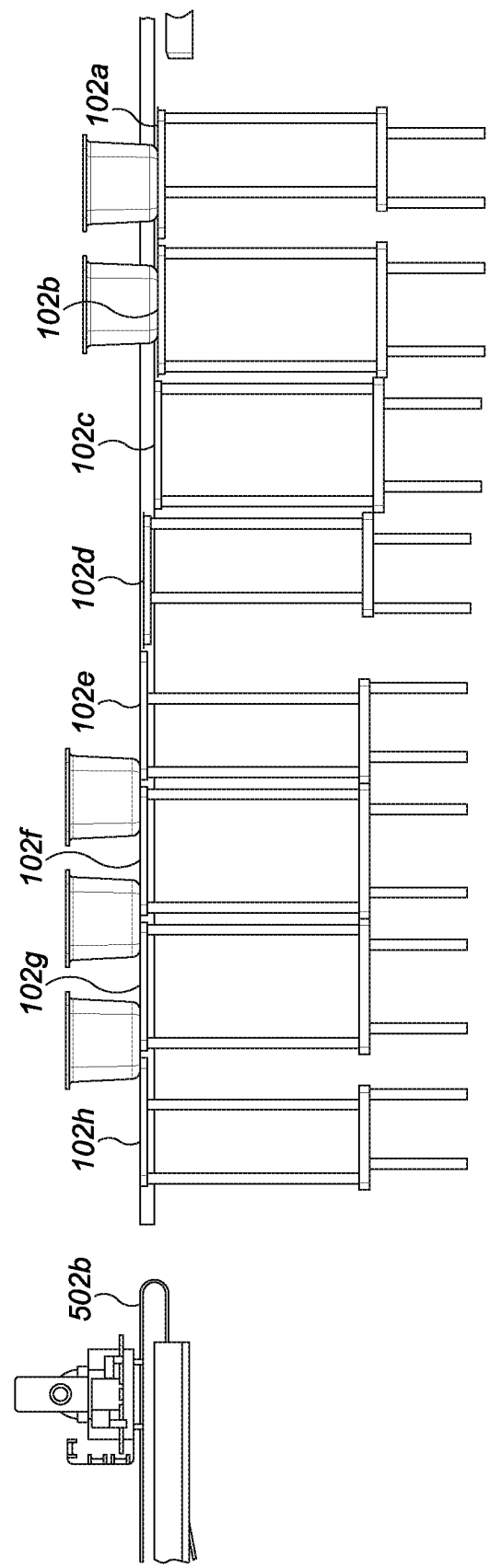
FIG. 1.3

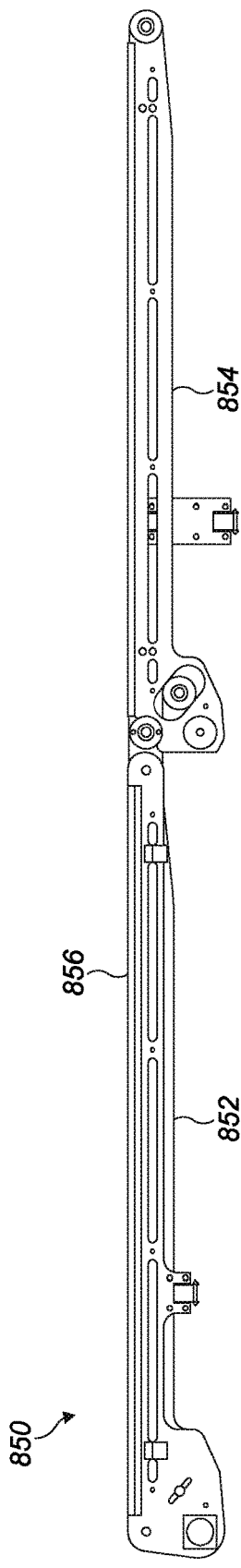
FIG. 1.4
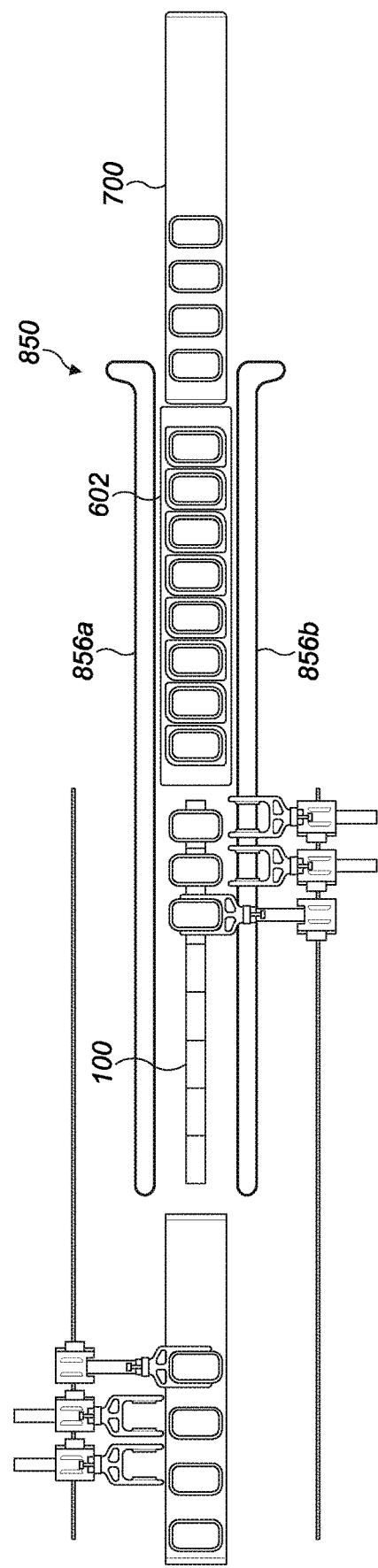
FIG. 1.5

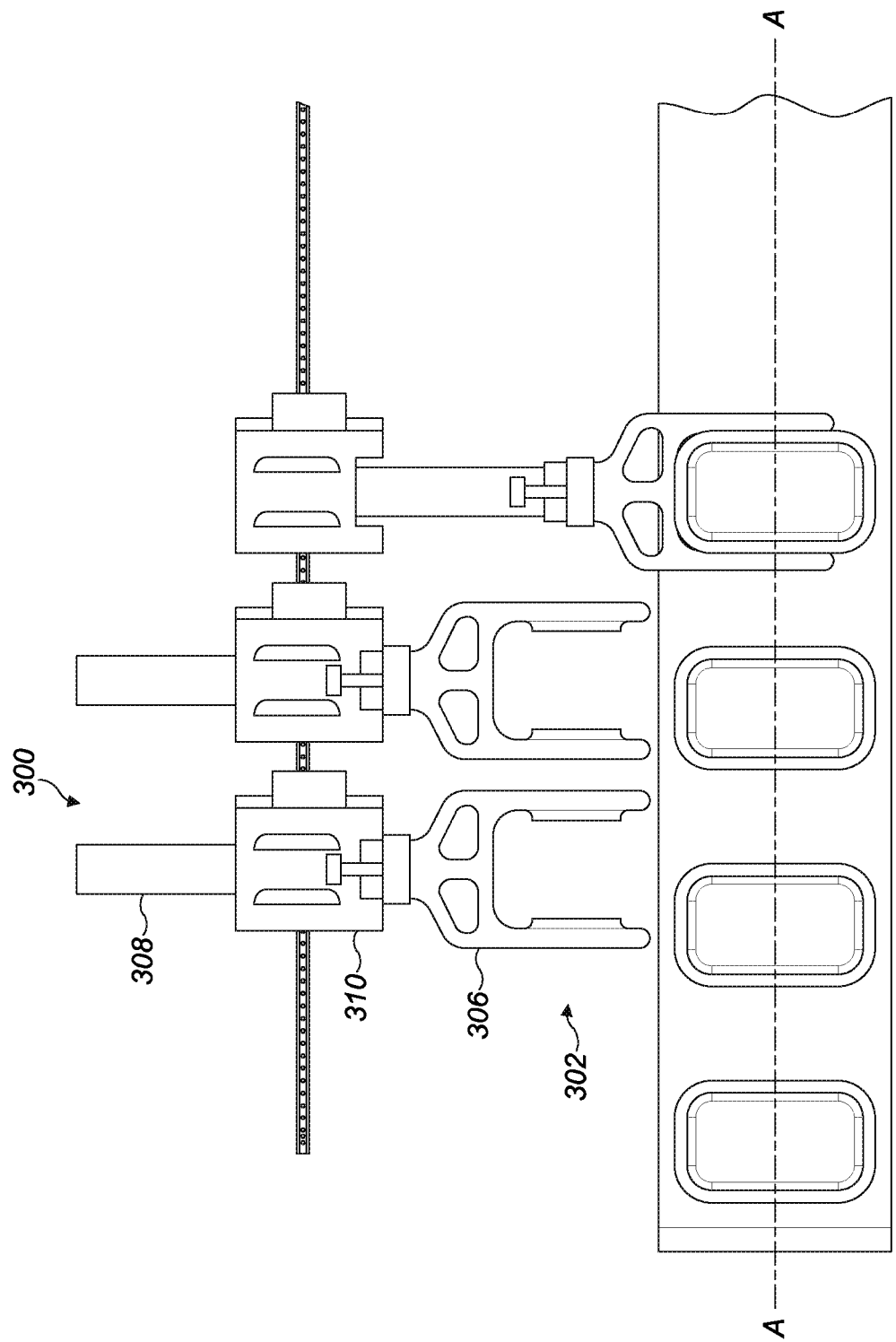
FIG. 1.6

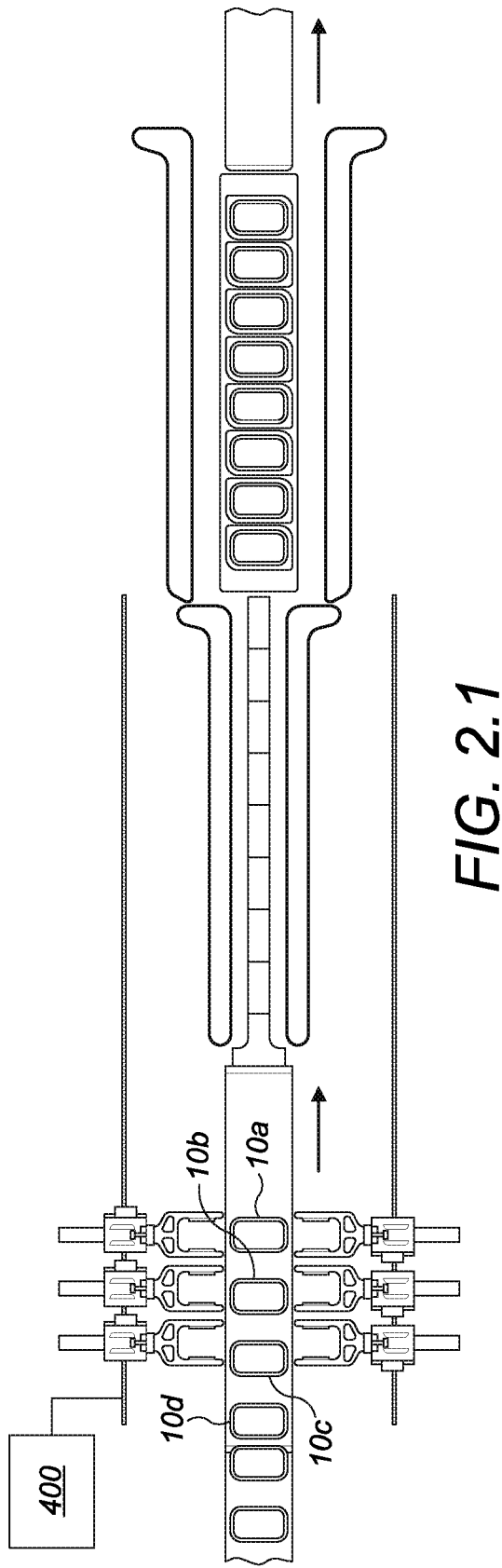
FIG. 2.1
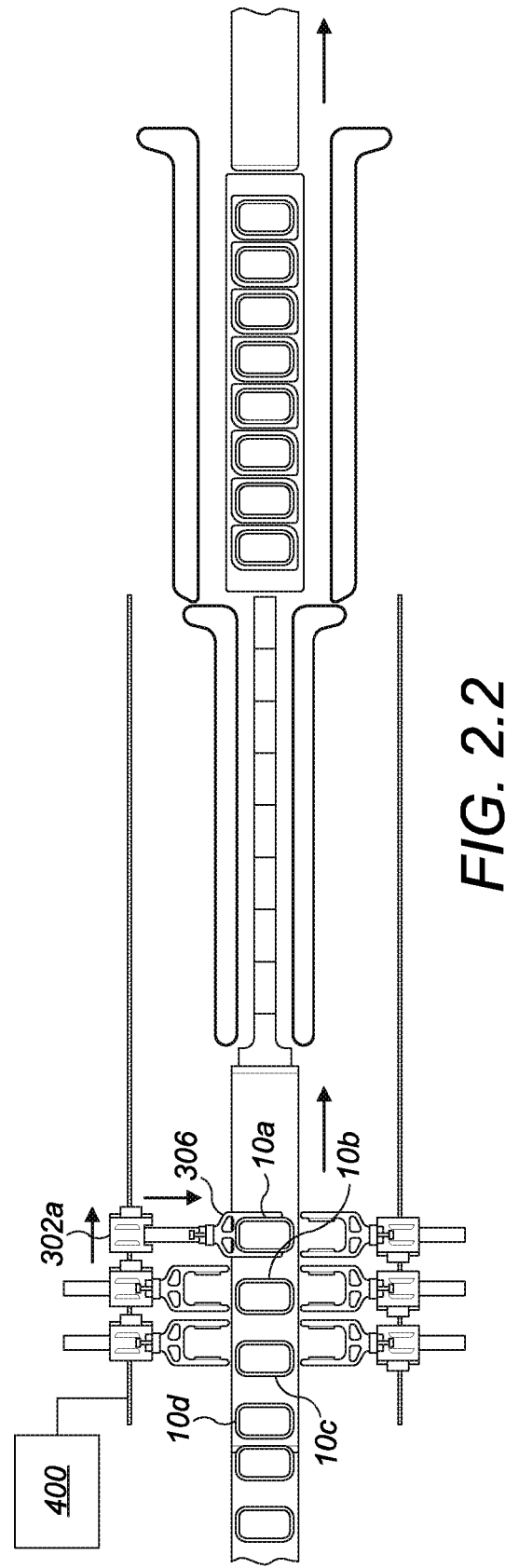
FIG. 2.2

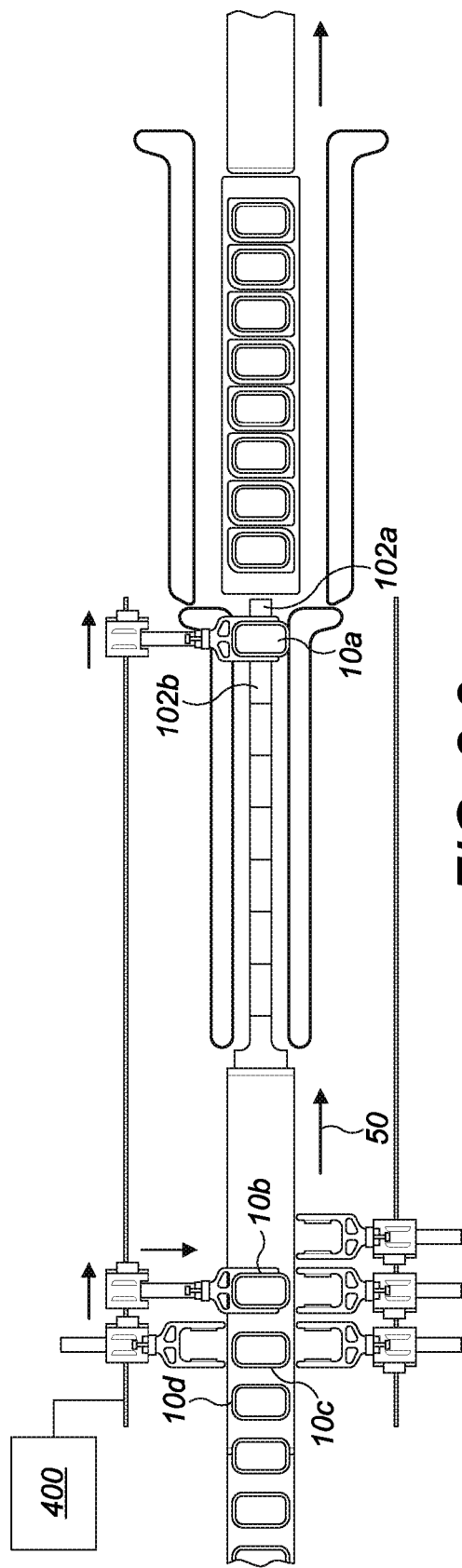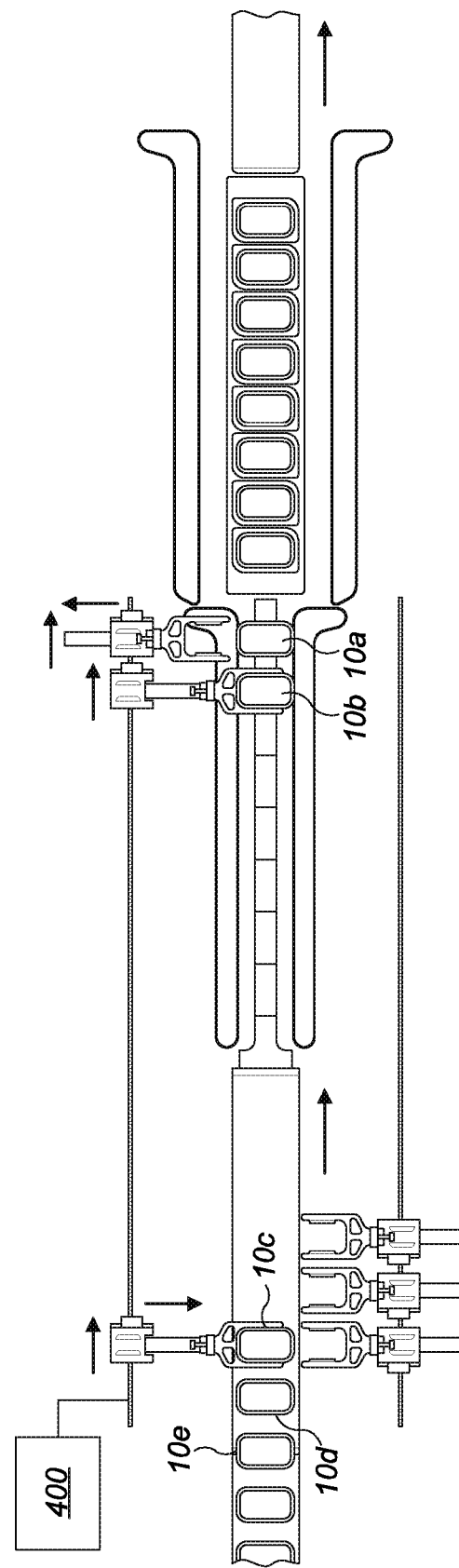
FIG. 2.3
FIG. 2.4

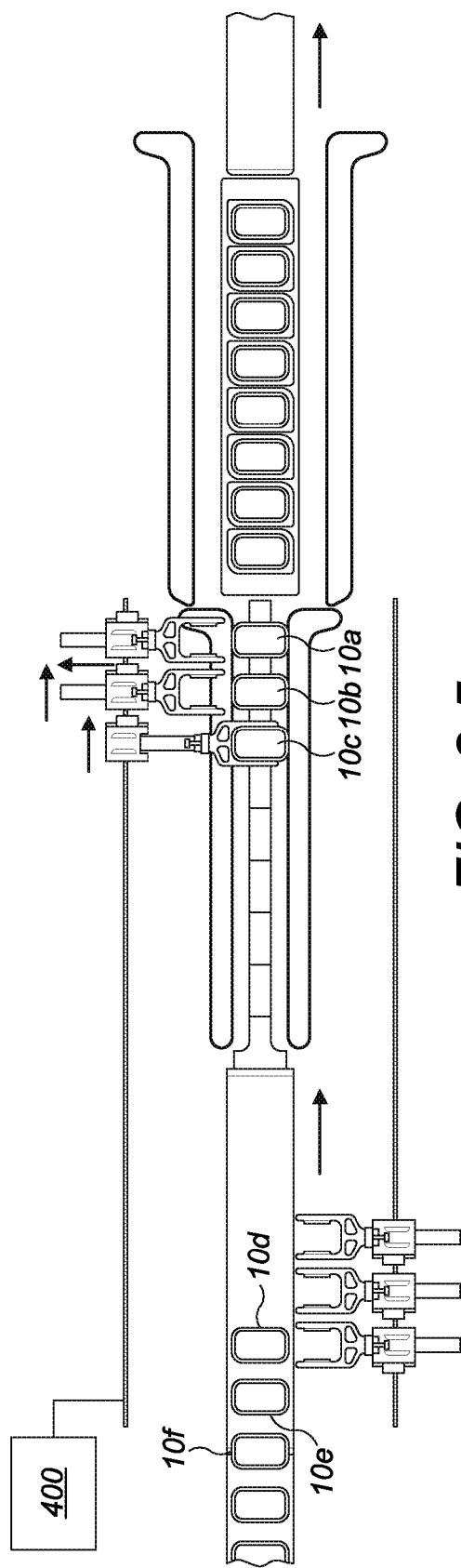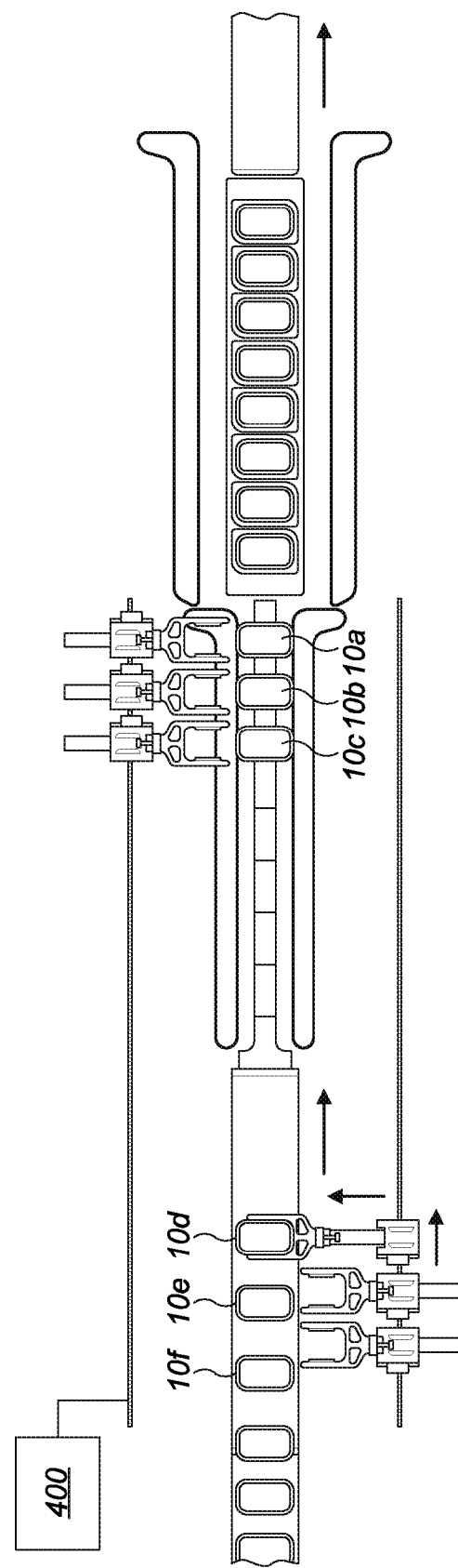

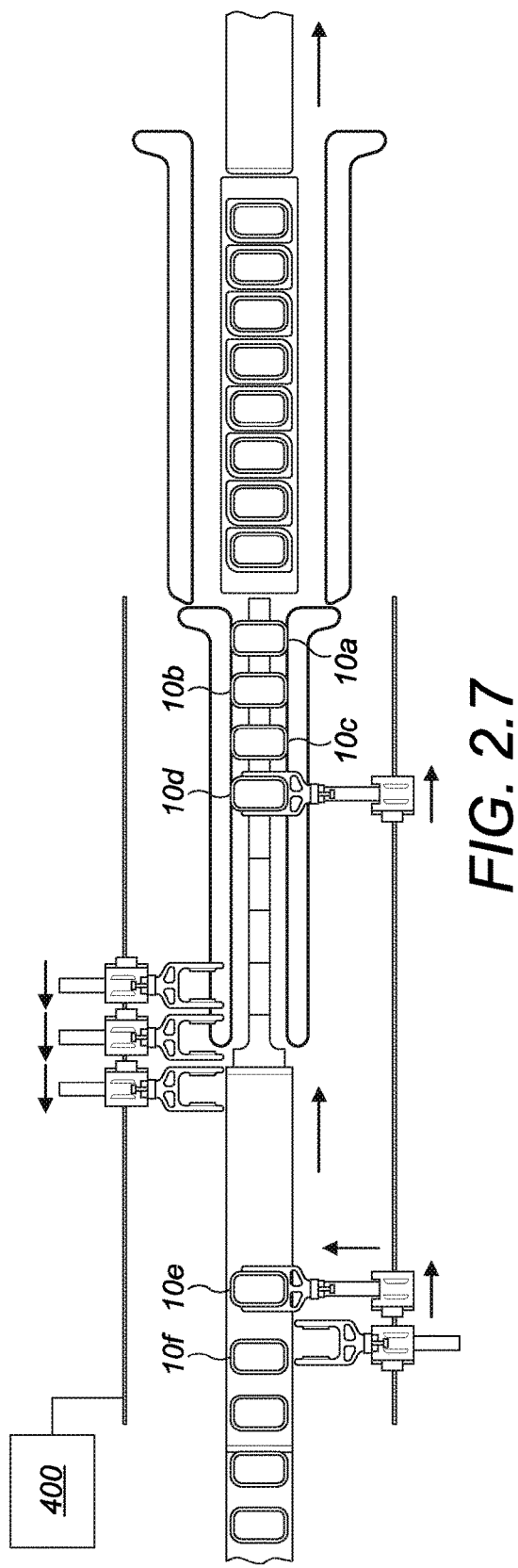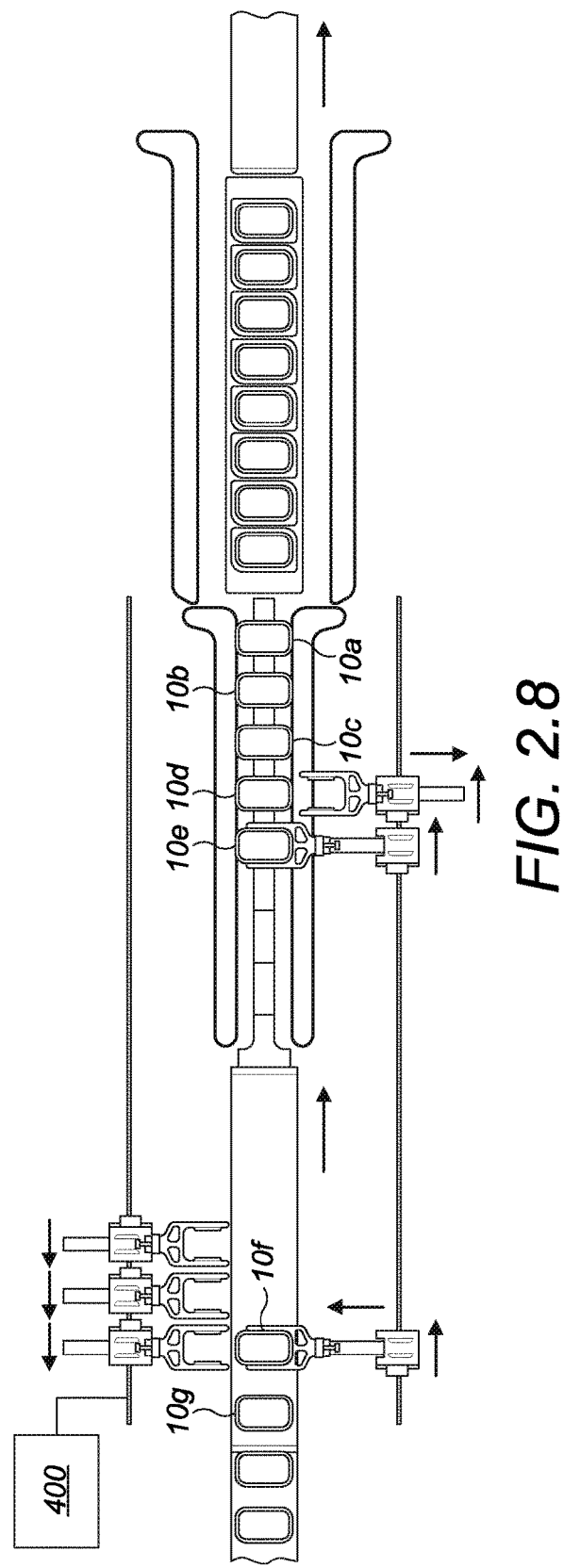

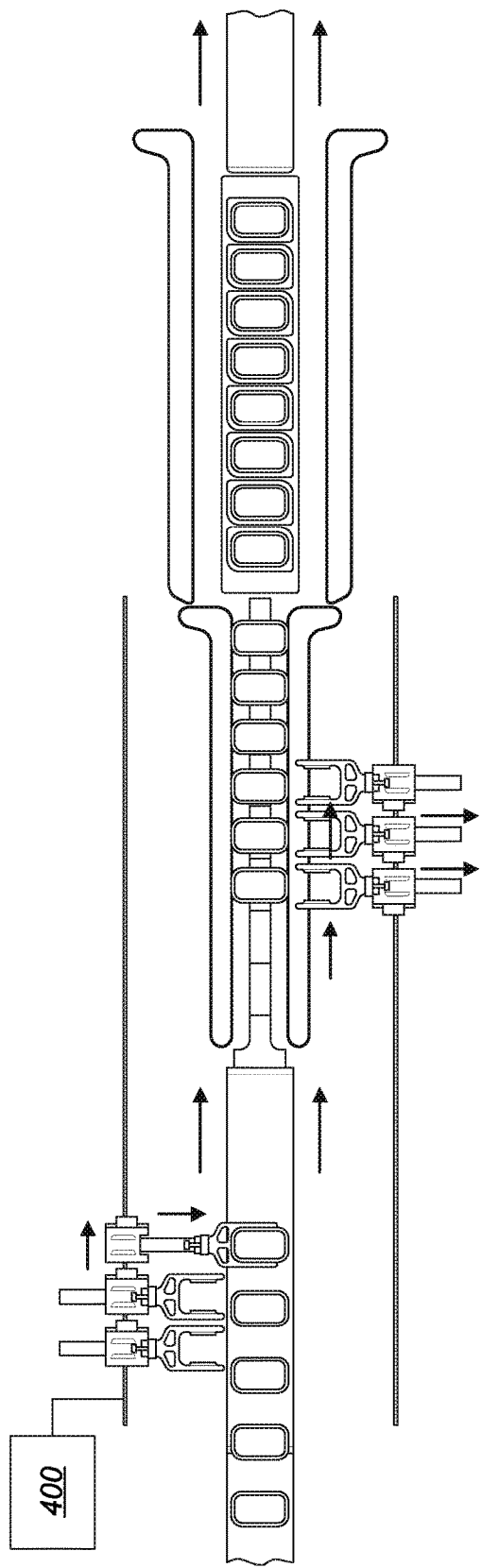
FIG. 2.9
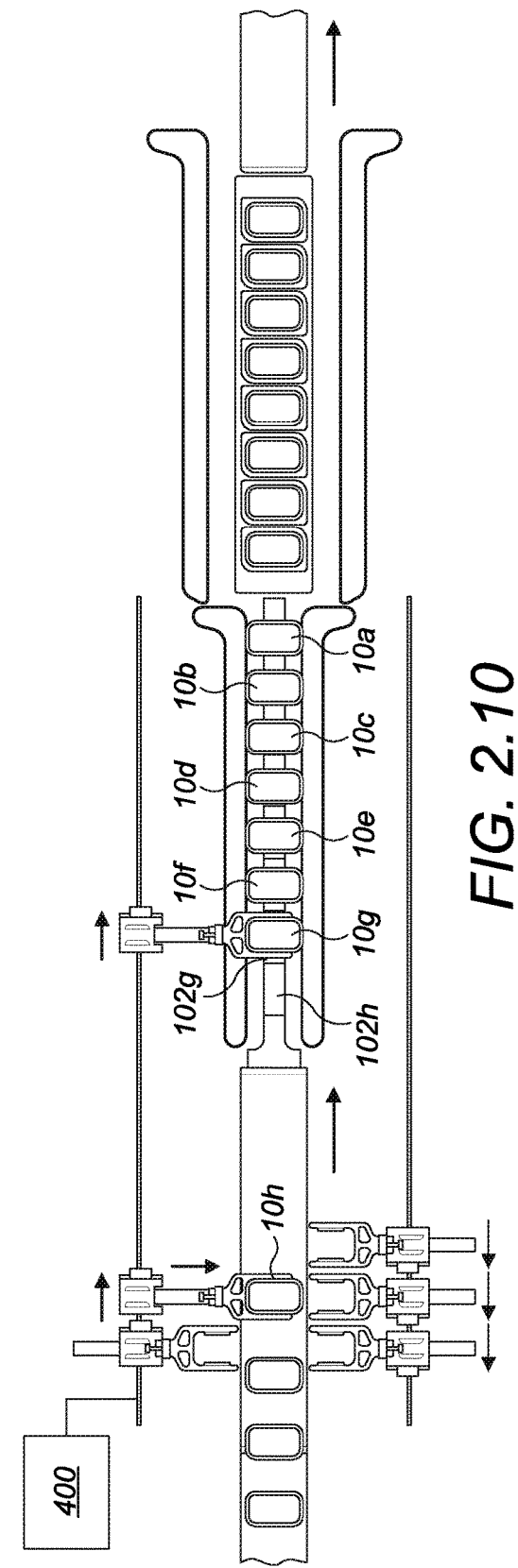
FIG. 2.10

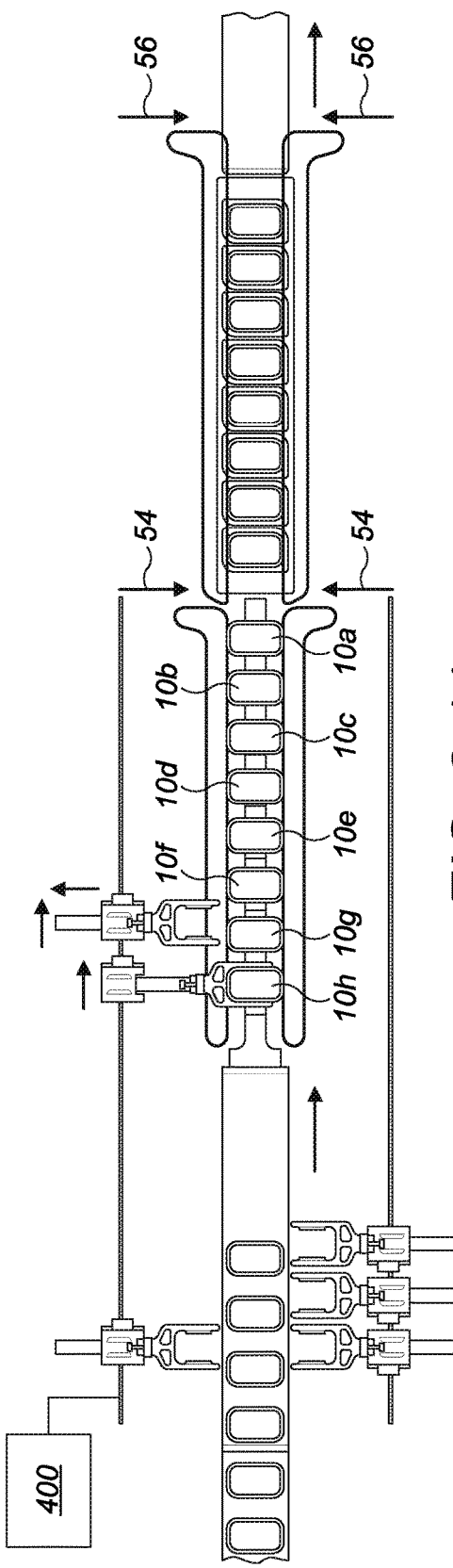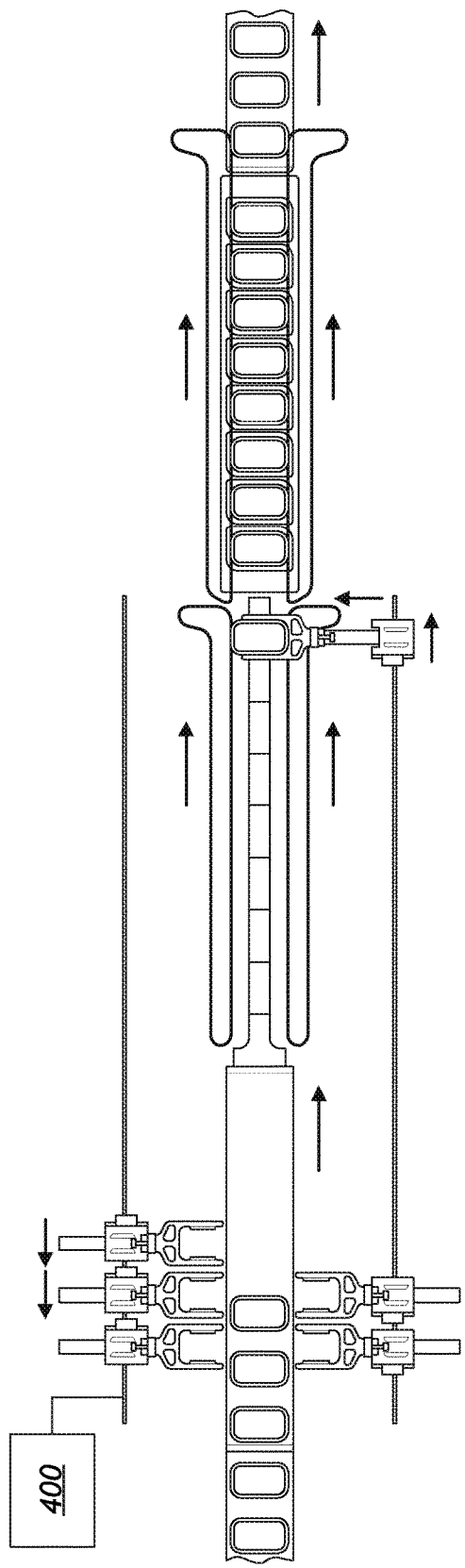

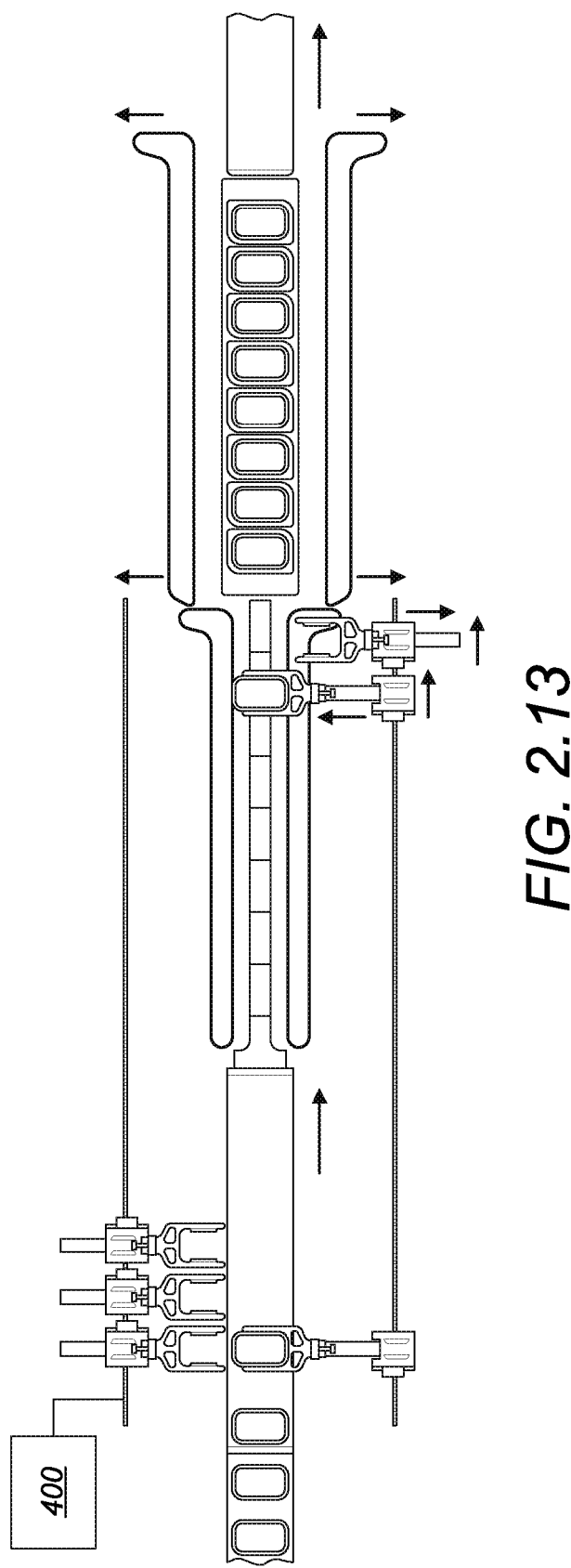
FIG. 2.13

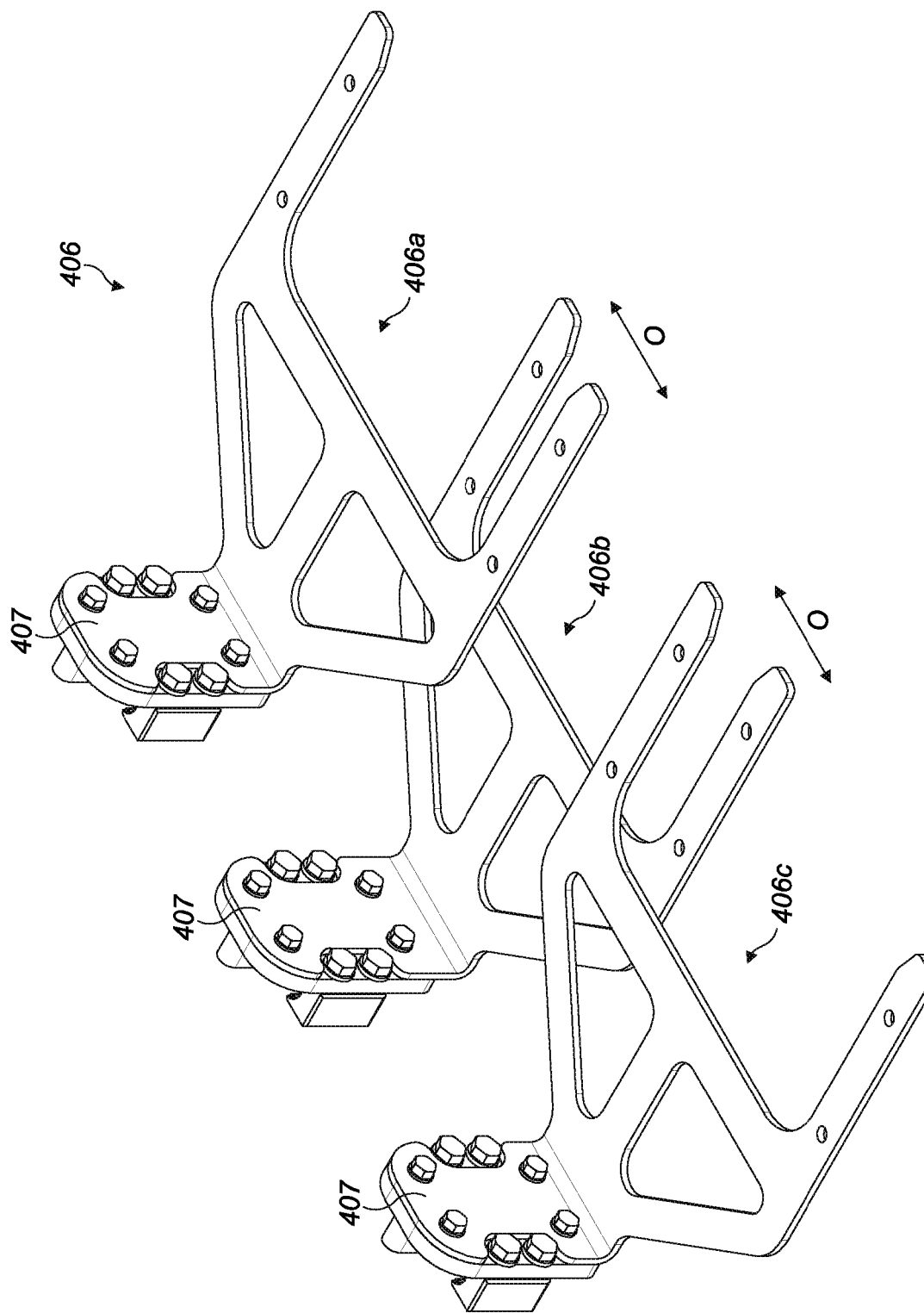
FIG. 3.1

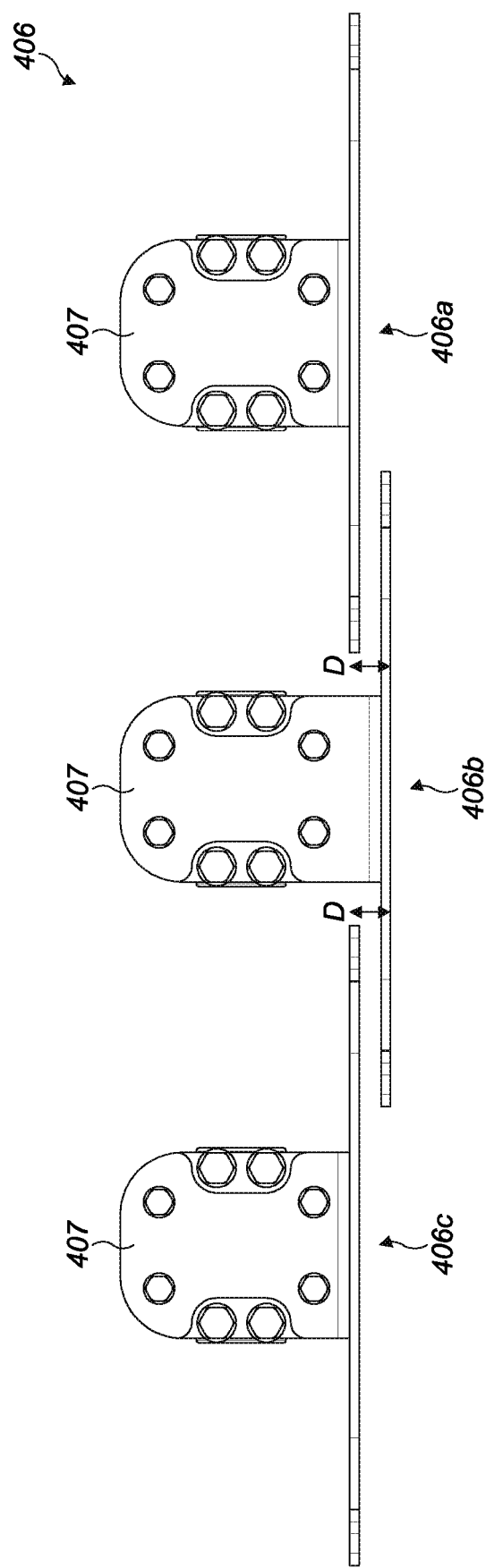
FIG. 3.2

PACKAGING APPARATUS

FIELD OF INVENTION

The present invention relates to packaging apparatus and to methods of packaging.

BACKGROUND TO THE INVENTION

A known type of packaging apparatus which can be used to produce sealed packaging containers comprises a sealing station for sealing film to packaging containers. In such apparatus, it is known to use transfer arms to transport packaging containers into, through and out of the sealing station.

Conventionally, conveyor belts are used to space the packaging container so that they may be engaged by the transfer arms. The need to space packaging containers in this way has a limiting effect upon the speed at which the packaging apparatus may be operated, and, ultimately, on throughput.

Packaging containers are available in various shapes and sizes. Sealing tools comprised in sealing stations also vary in configuration. Typically, transfer arms are replaceable so that they may be swapped in and out to accommodate a change in packaging container or sealing tool. Replacing transfer arms can result in considerable periods of time during which the apparatus is not operational.

Accordingly, the present invention aims to address at least one disadvantage associated with known packaging apparatus whether discussed herein or otherwise.

SUMMARY OF INVENTION

According to the present invention there is provided an apparatus and method as set forth in the appended claims. Other features of the invention will be apparent from the dependent claims, and the description which follows.

According to a first aspect of the present invention there is provided a packaging apparatus comprising:
  a support platform for supporting packaging containers positioned thereon; and
  a packaging container positioning apparatus for positioning packaging containers on the support platform,
  the packaging container positioning apparatus comprising:
  one or more rails that each form a path for conveying devices;
  a plurality of individually controllable conveying devices comprising at least a first conveying device and a second conveying device, each conveying device mounted on a rail for moving along the path; and
  a control system configured to control the conveying devices,
  wherein the control system is configured to control each conveying device to: engage a packaging container, move along the path in a first conveying direction, and release the packaging container, to position the packaging container on the support platform.

In this way, a packaging apparatus is provided that may facilitate positioning and spacing of packaging containers using individual conveying devices. This may be advantageous as the packaging containers may be moved and accelerated smoothly, thus reducing instantaneous force applied to the packaging container which may otherwise cause the contents of the packaging container to spill or be displaced.

Moreover, whilst the maximum operational speed of prior art conveyor belt spacing systems may be limited by the frictional forces between containers and the conveyor belt, no such problem may arise when using conveying devices. The present construction may therefore provide for high positioning speed, and high throughput of packaging containers.

Additionally, by providing a control system configured to control conveying devices to engage packaging containers, secure collection and movement of the packaging containers may be provided. The conveying devices being controlled to release the packaging containers may facilitates accurate positioning. That is, releasing the packaging container may be an active movement of disengaging with the packaging container, to provide highly accurate positioning on the support platform.

Suitably, the packaging apparatus comprises an infeed assembly, the control system being configured to control each conveying device to engage a container at the infeed assembly.

In this way, packaging containers may be moved from the infeed into position on the support platform solely using the conveying devices. As explained above, use of conveying devices may significantly increase the speed at which containers can be positioned, and thus the time from initial engagement of the container at the infeed to final positioning on the support platform is considerably reduced.

Suitably, the control system is configured to control conveying devices to engage moving containers. Suitably, the control system is configured to control a conveying device to match the speed of a container with which it is to engage at the infeed assembly.

Packaging containers at the infeed assembly may be in motion, and thus engaging at the infeed assembly using conveying devices may facilitate a construction which mitigates the need to change the velocity of the packaging containers at the infeed assembly and which may avoid the need to bring containers to a stop at the infeed assembly.

Suitably, the packaging apparatus comprises an infeed assembly comprising an infeed belt. The control system may be configured to control each conveying device to engage a container at the infeed belt. The infeed assembly may comprise a first infeed belt and a second infeed belt. The second infeed belt may be arranged to receive packaging containers from the first infeed belt. The control system may be configured to control each conveying device to engage a container at the second infeed belt. The packaging container positioning apparatus may be configured to receive a continuous infeed of packaging containers from the infeed assembly. The infeed assembly may be configured to provide a continuous infeed, or supply, of packaging containers to the packaging container positioning apparatus. That is, the packaging apparatus may comprise an infeed belt run continuously. In conventional packaging apparatus, stepping is required, and thus in known systems the infeed belt is not run continuously but instead is run as a stepping belt. The packaging apparatus is configured such that a stepping belt may not be required.

Infeed belts may provide a robust and reliable infeed to packaging apparatus. Engaging the packaging containers at the infeed belt may avoid the need for the packaging containers to be transferred onto another surface from which they may be collected. Additionally, infeed belts may be run at a high travel speed. This high travel speed, combined with the ability of the conveying devices to engage the container at the infeed assembly, may provide for rapid packaging container movement and positioning.

Suitably, the packaging apparatus comprises a control system configured to control the conveying devices to match the speed and/or acceleration of the infeed belt.

Matching the speed and/or acceleration of the infeed belt may minimise instantaneous forces on the packaging containers and its contents. This may reduce the likelihood of spillage, displacement or damage to the contents of the packaging container. Moreover, this may improve apparatus throughput, as the packaging containers may need not be accelerated (or, in particular, decelerated) in order to be engaged by the conveying devices. As alluded to above, this deceleration may cause the packaging container to slip. The present construction may avoid this problem and is therefore highly advantageous. Furthermore, the need to stop the infeed belt may be avoided.

Suitably, each conveying device comprises an engaging member moveable between a first, retracted, position and a second, extended, position, facilitating engagement and release of a packaging container.

In this way, the conveying devices may not impede the progress of packaging containers along the infeed belt but may then move from the retracted position to the extended position to engage the packaging container. Following movement of the packaging container into position, the engaging member may then be retracted to allow for subsequent movement of the packaging container. Furthermore, the engaging member being movable back to the retracted position may allow the conveying device to be moveable in a direction opposite to the first conveying direction. That is, following retraction of the engaging member, the conveying device may move back to a position in which it may engage a further container upstream.

The engaging member may comprise a pair of jaws. The engaging member may be height adjustable, that is, adjustable in the vertical direction. In this way, packaging containers of varying heights may be accommodated. The conveying device may comprise an arm. The engaging member may be mounted on the arm. A portion of the engaging member may be arranged to be able to overlap a portion of another engaging member. The jaws of adjacent engaging members may be arranged to be able to overlap in the first conveying direction. The jaws of adjacent engaging members may be vertically displaced relative to one another so that the jaws can overlap in the first conveying direction. By such a construction, following placement and release of a packaging container by a first conveying device, it may be possible to avoid adjustment of the position of the first conveying device in order to accommodate or facilitate the positioning of a subsequent packaging container by a second, incoming, conveying device. Suitably, the apparatus comprises a plurality of engaging members arranged such that alternate engaging members on each rail travel in the first conveying direction in vertically displaced planes. For example first and third engaging members may travel in a first plane and a second engaging member positioned between the two may travel in a second, for example higher, plane.

The conveying devices may be configured to suit a number of packaging containers of different shapes and sizes. The conveying devices may be configured such that a single engaging member can engage packaging containers of different sizes, for example by adjusting its height. The conveying devices may have interchangeable engaging members such that engagement members may be changed to accommodate different shapes and sizes.

Suitably, the packaging container positioning apparatus comprises two rails that each form a path for conveying devices.

Suitably, the one or more rails are a pair of spaced apart rails on which the conveying devices are mounted. Suitably, at least one conveying device is mounted on each rail.

In this way, by not mounting all conveying devices on a single rail, conveying devices on one of the rails may be moved in the first conveying direction, and, at the same time, conveying devices mounted on the other one of the rails may be moved in a direction opposite to the first conveying direction. That is, whilst the conveying devices mounted on one of the rails are moving containers into position on the support platform, the conveying devices mounted on the other one of the rails can move back upstream to be ready to engage subsequent packaging containers.

Suitably a first conveying device is mounted on a first rail and a second conveying device is mounted on a second rail.

In this way, the first conveying device may move in the first conveying direction whilst the second conveying device may move simultaneously in a direction opposite to the first conveying direction.

Suitably, a plurality of conveying devices are mounted on each rail.

Such a construction may allow a plurality of packaging containers to be conveyed in the first conveying direction and positioned on the support platform using conveying devices mounted on a first one of the rails before the conveying devices mounted on a second one of the rails are employed to move subsequent containers in the first conveying direction. Having positioned containers, the conveying devices mounted on the first one of the rails may then be moved in the direction opposite to the first conveying direction, whilst the conveying devices mounted on the second rail convey containers in the first direction, in preparation for engaging subsequent containers. Providing the plurality of containers on each rail may thus increase apparatus throughput and operational speed.

Suitably, the apparatus is configured such that conveying devices are moved cyclically with a conveying device on the first rail moved in a first direction whilst a conveying device on the second rail is moved in an opposed second direction and vice versa.

Advantageously cyclical movement in this manner, may increase apparatus throughput and the speed at which packaging containers can be positioned.

Suitably, the control system is configured to:
control a first conveying device to:
engage a packaging container, move in the first direction along the path, and release the packaging container; and, at least partly simultaneously,
control a second conveying device to:
release a packaging container, move in a second direction along the path, opposite to the first direction, and engage a packaging container.

By this construction high apparatus throughput may be achieved.

Suitably, a first set of conveying devices is mounted on a first rail and a second set of conveying devices is mounted on a second rail. The first set of conveying devices may comprise one, two, three or more conveying devices. The second set of conveying devices may comprise one, two, three or more conveying devices.

By this construction, the first set of conveying devices may be controlled to position a first set of packaging containers on the support platform and the second set of conveying devices may be controlled to position a second set of packaging containers on the support platform. The second set of packaging containers may be positioned subsequent to the first set.

Suitably, the control system is configured to control the conveying devices such that there is always a conveying device positioned upstream of the support platform ready to engage a packaging container.

Suitably, the control system is configured to repeatedly:
(i) control a first set of conveying devices to each engage a packaging container, move in the first direction along the path and release the packaging container; and,
(ii) control a second set of conveying devices to each engage a packaging container, move in the first direction along the path and release the packaging container; and
(iii) control the first set of conveying devices to move in a second direction along the path, opposite to the first direction, on completion of operation (i) whilst the second set of conveying devices is performing operation (ii); and
(iv) control the second set of conveying devices to move in a second direction along the path, opposite to the first direction, on completion of operation (ii) whilst the first set of conveying devices is performing operation (i).

This is advantageous for reasons which will be apparent from the above and may achieve high apparatus throughput.

Suitably, the control system is configured to control a conveying device to adjust its position by advancing in a first conveying direction after it releases a packaging container. The adjustment of position may move the conveying device out of the way of an incoming conveying device. In this way, close-space positioning of packaging containers may be facilitated.

Suitably, the control system is configured to control the conveying devices such that packaging containers are conveyed to and positioned on the support platform one by one. Suitably, the infeed assembly is configured to provide a continuous infeed of packaging containers to the packaging container positioning apparatus, and the control system is configured to control the conveying devices such that there is always a conveying device ready to collect a packaging container and convey it to the support platform.

In this manner the positioning and spacing of packaging containers on the support platform may be accurately controlled whilst a continuous flow of packaging containers may be collected from an infeed assembly which may allow for efficient operation.

Suitably, the packaging apparatus is configured such that packaging containers are transported away from the support platform as a batch of two or more.

Suitably, the packaging apparatus further comprises a belt transport arrangement for transporting packaging containers away from the support platform in a first transport direction.

Advantageously, the belt transport arrangement may replace the transfer arms of the prior art. The belt transport arrangement may be used to transport packaging containers of various shapes and sizes. Unlike transfer arms, there is no need to position packaging containers in specific bays with which to engage the packaging containers. Instead, any part of the length of the belt can be used to contact and transport the packaging containers. Furthermore, the belts need not be swapped in or out to accommodate a change in shape or size in packaging container, which may minimise time in which the apparatus is not operational.

Positioning of packaging containers relative to one another, which may be important for subsequent processing, for example sealing at a sealing station, may be determined by their positioning and spacing on the support platform which is determined by the conveying devices as controlled by the control system. The belt transport arrangement may be configured to engage, and transport, containers form the support platform in a manner which maintains the spacing between containers as it was on the support platform.

Suitably the belt transport arrangement is configured to transport containers from the support platform as a batch maintaining the spacing between them.

Suitably, the belt transport arrangement comprises a pair of belts, the pair of belts defining opposing contacting surfaces, optionally comprising an adjustable draft angle, for contacting packaging containers.

The pair of belts defining opposing contacting surfaces may allow the packaging containers to be contacted by any length of the belts. The belts may therefore accommodate a range of shapes and sizes of packaging containers. The adjustable draft angle may allow the draft angle to be adjusted to match the draft angle of packaging containers. This may ensure secure contact with said containers and stable transport.

Suitably, the belt transport arrangement comprises: (i) a first belt region for contacting packaging containers for transporting packaging containers away from the support platform; and (ii) a second belt region, downstream of the first belt region, for transporting packaging containers away from the first belt region. The first belt region and second belt region may be independently controllable. The second belt region may be controllable to be brought into alignment with the first belt region.

Such a construction may be advantageous in transporting positioned packaging containers away from the support platform, and into a subsequent part of the packaging apparatus, such as for example a sealing station.

Suitably, the belt transport arrangement comprises a pair of belts which extend across both the first belt region and the second belt region, and wherein: (i) the separation of the belts is adjustable in the first belt region; and (ii) the separation of the belts is adjustable in the second belt region; and the adjustment of the separation of the belts in either region is independent of the adjustment of the separation in the other.

Alternatively, the belt transport arrangement may comprise a first belt region comprising a first pair of belts, the first pair of belts defining opposing contacting surfaces, optionally comprising an adjustable draft angle, for contacting packaging containers. Suitably, the belt transport arrangement comprises a second belt region comprising a second pair of belts, the second pair of belts defining opposing contacting surfaces for contacting packaging containers, optionally comprising an adjustable draft angle, the second pair of belts being provided downstream of the first pair of belts along the first transport direction, and controllable to be brought into alignment with the first pair of belts.

Suitably, the belt transport arrangement can be configured such that in one arrangement, the separation of the belts in the first belt region is such to allow packaging containers to pass freely between the belts, whilst the separation of the belts in the second belt region is such that the belts are free of other moving parts of the packaging apparatus, for example the tooling of a sealing station.

Suitably, the belt transport arrangement can be configured such that in another arrangement, the separation of the belts in the first and second belt regions is such to allow the belts to engage packaging containers such that the belts can transport the containers.

Suitably, the belt transport arrangement is adjustable to adjust the separation between the contacting surfaces of the belts in the second belt region, and wherein the belt transport arrangement is configurable, for example repeatedly, in: a first configuration wherein the separation between the contacting surfaces of the belts in the second belt region is substantially the same as the separation between the contacting surfaces of the belts in the first belt region; and a second configuration wherein the separation between the contacting surfaces of the belts in the second belt region is greater than the separation between the contacting surfaces of the belts in the first belt region.

Suitably, the packaging apparatus comprises a processing station downstream of a first belt region. Suitably, the processing station is a sealing station.

Suitably, the packaging apparatus comprises a sealing station. Suitably, the sealing station comprises a sealing tool which may swapped in and out for another to suit containers to be sealed.

Advantageously, whilst the sealing tool provided in the sealing station may be swapped in and out to seal packaging containers of different sizes, the belt transport arrangement need not be, and the conveying devices may be configured to suit a number of packaging containers of different sizes. The conveying devices and belt transport arrangement may therefore be advantageous when used in a packaging apparatus comprising a sealing station.

Suitably, the belt transport arrangement is configurable to transport containers into the sealing station.

Suitably, the support platform comprises an adjustable height portion.

In this way, the support platform may be moveable into a position which facilitates the positioned packaging containers to be transported away from the support platform.

Suitably, the support platform comprises a plurality of support portions of individually adjustable height. Suitably, the support platform comprises at least two support portions of individually adjustable height, for example between three and eight portions. Suitably each is adjustable with a first height corresponding to the height of an infeed assembly and a second lower height.

In this way, the portions may be individually movable into a position to allow packaging containers to be supported thereon, whilst other portions are in a position which allows the packaging containers to be transported away from the support platform. As a result, this may improve apparatus throughput and efficiency.

Suitably, the belt transport arrangement is configured to transport containers into the sealing station in a batch which may have a batch size which correspond to the number of support portions.

Suitably, the belt transport arrangement is configured to transport containers into the sealing station in a batch which has a batch size which correspond to the number of containers that the sealing station can accommodate.

Suitably, the control system is configured to control the conveying devices to position packaging containers on the support platform with a spacing which corresponds to the spacing required between the containers in the sealing station.

Suitably, the belt transport arrangement is configured to transport the packaging containers from the support platform to the sealing station maintaining a spacing which corresponds to the spacing required between the containers in the sealing station.

Suitably, the packaging apparatus comprises an apparatus for packaging food.

Suitably, the packaging containers comprise trays.

Suitably, the control system is configured to control the operation of at least one of: a support platform; belt transport arrangement; and sealing station; as well as the conveying devices. Suitably, the control system is configured to control the operation of at least a support platform and belt transport arrangement as well as the conveying devices.

The apparatus may be configured to perform the method of the second aspect. The apparatus may comprise an apparatus according to the third aspect and may be configured to perform the method of the fourth aspect.

According to a second aspect of the present invention there is provided a method of positioning packaging containers on a support platform using a plurality of individually controllable conveying devices comprising at least a first conveying device and a second conveying device, each conveying device being mounted on a rail for moving along a path formed by the rail, the method comprising the steps of:

engaging a packaging container using a conveying device;
moving the conveying device along the path in a first conveying direction; and
releasing the packaging container, thereby positioning the packaging container on the support platform.

In this way, a method of positioning packaging containers is provided that may facilitate positioning and spacing of packaging containers using conveying devices. Positioning and spacing packaging containers using conveying devices may be advantageous as the packaging containers may be moved and accelerated smoothly, thus reducing instantaneous force applied to the packaging container which may otherwise cause the contents of the packaging container to spill or be displaced.

Moreover, whilst the maximum operational speed of prior art methods may be limited by the frictional forces between containers and conveyor belts, no such problem may arise when using conveying devices. The present method may therefore provide for high positioning speed, and high throughput of packaging containers.

Additionally, the step of engaging before moving the packaging container may ensures secure collection and movement of said container. The step of releasing the packaging container may facilitate accurate positioning. That is, releasing the packaging container may be an active movement of disengaging with the packaging container, to provide highly accurate positioning on the support platform.

The method may comprise any feature as described in relation to the first aspect.

Suitably, the method comprises positioning packaging containers ready for transport to a sealing station.

Suitably, the method comprises positioning packaging containers containing goods, for example food.

Suitably, the method comprises positioning packaging containers on the support platform with a spacing which corresponds to the spacing required between the containers in the sealing station.

Suitably, the method comprises using an apparatus according to the first aspect. The method may comprise using an apparatus according to the third aspect. The method may comprise performing the method of the fourth aspect. The method may use an apparatus according to the fifth aspect.

According to a third aspect of the present invention there is provided a packaging apparatus comprising:

a support platform for supporting packaging containers positioned thereon, the support platform comprising a support portion moveable between a first position and a second position;

a belt transport arrangement for transporting packaging containers away from the support platform in a first transport direction;

the belt transport arrangement comprising a first belt arrangement comprising a pair of belts, the pair of belts defining opposing contacting surfaces for contacting packaging containers;

the apparatus being operable between:

a first configuration wherein the support portion is in the first position to support one or more packaging containers positioned thereon; and a second configuration wherein the support portion is in the second position and contacting surfaces of the belts engage the one or more packaging containers.

In this way, a packaging apparatus is provided that may facilitate the transport of packaging containers using a belt transport arrangement, rather than transfer arms, as is common in the prior art. Transporting packaging containers using a belt transport arrangement is advantageous as belts may accommodate packaging containers of varying shapes and sizes, without a need to replace or modify the belt construction. It is often necessary to process containers of different sizes in packaging apparatus, and thus the belt transport arrangement may save considerable amounts of time in which the apparatus would otherwise not be operational. Belt transport may also be more robust and is simpler than transport using transfer arms. Furthermore, belts may have a smaller profile than transfer arms, thus facilitating a more compact apparatus construction. A belt transport arrangement may also not require a high energy input.

Suitably, the opposing contacting surfaces of the belt may be for contacting side surfaces of packaging containers.

Advantageously, this may accommodate packaging containers of various shapes and sizes. The length and width of packaging containers can vary substantially, but this may not be a limiting factor to a belt transport arrangement configured to contact side surfaces of packaging containers.

Suitably, the belt transport arrangement comprises: (i) a first belt region for contacting packaging containers for transporting packaging containers away from the support platform; and (ii) a second belt region, downstream of the first belt region, for transporting packaging containers away from the first belt region.

Suitably, the belt transport arrangement comprises a pair of belts which extend across both the first belt region and the second belt region, and wherein: (i) the separation of the belts is adjustable in the first belt region; and (ii) the separation of the belts is adjustable in the second belt region; and the adjustment of the separation of the belts in either region is independent of the adjustment of the separation in the other.

Advantageously, the belt regions being independently adjustable may allow the first belt region to be configured to facilitate a first task, for example, to allow packaging containers to be positioned on the support platform, whilst the second belt region is configured to facilitate a second task, for example, to allow packaging containers to be sealed in a sealing station. The two regions being individually adjustable may allow the regions to be adjusted into an optimal position, which may not be the same position for both regions, and may instead depend on the apparatus construction. As a single belt which extends across both regions, the belt travels at the same speed in both regions.

There is therefore no speed differential when a packaging container passes from the first belt region to the second belt region, which may be beneficial in ensuring stable transport.

Suitably, the belt transport arrangement is adjustable to adjust the separation between the contacting surfaces of the belts in the second belt region, and wherein the belt transport arrangement is configurable, for example repeatedly, in: a first configuration wherein the separation between the contacting surfaces of the belts in the second belt region is substantially the same as the separation between the contacting surfaces of the belts in the first belt region; and a second configuration wherein the separation between the contacting surfaces of the belts in the second belt region is greater than the separation between the contacting surfaces of the belts in the first belt region.

In this way, in the first configuration, the belt regions may be aligned to allow packaging containers to pass from one region to another. Additionally, in the second configuration, the belts in the second belt region may be moved clear of other apparatus components to allow subsequent packaging operations to take place.

Alternatively, the belt transport arrangement may comprise an arrangement in which: (i) the first belt region comprises a first pair of belts, the first pair of belts defining opposing contacting surfaces for contacting packaging containers and having an adjustable separation; and (ii) the second belt region comprises a second pair of belts, the second pair of belts defining opposing contacting surfaces for contacting packaging containers and having an adjustable separation.

Each region having its own pair of belts may provide a construction in which the separation is easily individually adjustable.

Suitably, the belt transport arrangement is adjustable to adjust the separation between the contacting surfaces of the second pair of belts, and wherein the belt arrangement is configurable, for example repeatedly, in: a first configuration wherein the separation between the contacting surfaces of the second pair of belts is substantially the same as the separation between the contacting surfaces of the first pair of belts; and a second configuration wherein the separation between the contacting surfaces of the second pair of belts is greater than the separation between the contacting surfaces of the first pair of belts.

In this way, in the first configuration, the first and second pairs of belts may be aligned to allow packaging containers to pass from one pair of belts to the other. Additionally, in the second configuration, the second pair of belts may be moved clear of other apparatus components to allow subsequent packaging operations to take place.

Suitably, belt transport arrangement comprises a first belt region for transporting packaging containers away from the support platform to a sealing station and a second belt region for transporting packaging containers through a sealing station.

Suitably, the support platform comprises a plurality of support portions, each support portion being moveable between a first position and a second position, the packaging apparatus being operable between: a first configuration wherein the support portions are in the first position to support one or more packaging containers positioned thereon; and a second configuration wherein the support portions are in the second position and contacting surfaces of the belts engage the one or more packaging containers.

In this way, the support platform may be moveable to allow the belt transport arrangement to engage the packaging containers, by contact using the contacting surfaces, and transport the containers away from the support platform. The support platform being moveable between a first position and second position may mitigate a need for the belt transport arrangement to make an equivalent movement which may simplify the construction of the belt transport arrangement.

Suitably, the support portions are configured to move from the first position to the second position simultaneously.

This may be beneficial to allow packaging containers to be transported away from the support platform in a batch.

Suitably, the support portions are moveable from the second position to the first position in phased manner.

Suitably, the support portions are configured to start to move from the second position to the first position consecutively beginning with the most upstream.

This may be beneficial for increasing apparatus throughput as it may allow a set of packaging containers to begin to be conveyed onto the support platform whilst a previous set is still being transported away from it.

Suitably, the belt transport arrangement is adjustable to adjust the draft angle of the contacting surfaces of the belts.

This may be advantageous for accommodating packaging containers of varying shapes and sizes. By providing an adjustable draft angle of the contacting surfaces of the belts, varying container draft angles may be accommodated. As a result, stable transport of packaging containers may be achieved.

Suitably, the packaging apparatus comprises a control system configured to control the operation of the support platform and belt transport arrangement.

Suitably, the packaging apparatus further comprises a packaging container positioning apparatus for positioning packaging containers on the support platform.

Suitably, the apparatus is configured such that packaging containers are conveyed onto the support platform one by one and transported from the support platform, suitably to a sealing station as a batch of two or more.

Suitably, the packaging container positioning apparatus comprises: one or more rails that each form a path for conveying devices; a plurality of individually controllable conveying devices comprising at least a first conveying device and a second conveying device, each conveying device mounted on a rail for moving along the path.

Suitably, the packaging apparatus further comprises a control system configured to control the conveying devices, wherein the control system is configured to control each conveying device to: engage a packaging container, move along the path in a first conveying direction, and release the packaging container, to position the packaging container on the support platform.

The control system configured to control the conveying devices may comprise part of the packaging container positioning apparatus. The control system may further control the operation of the support platform and belt transport arrangement.

Such a construction combining a belt transport arrangement together with a packaging container positioning apparatus comprising conveying devices may provide high apparatus throughput as container positioning and container transport may be rapid. Furthermore, packaging containers of varying shapes and sizes may be positioned and transported with the same apparatus, without the need for down time for modification or alteration.

Suitably, the packaging apparatus further comprises a sealing station for sealing packaging containers.

Suitably, the packaging apparatus comprises a control system which controls operation of a packaging container positioning apparatus, a support platform, a belt transport arrangement and a sealing station.

Suitably, there is provide, a packaging apparatus comprising:
 a support platform for supporting packaging containers positioned thereon, the support platform comprising a first support portion moveable between a first position and a second position;
 a belt transport arrangement for transporting packaging containers away from the support platform in a first transport direction;
 the belt transport arrangement comprising a first belt arrangement comprising a first pair of belts, the first pair of belts defining opposing contacting surfaces for contacting packaging containers,
 the support platform being configurable, for example repeatedly, in:
 a first configuration wherein the first support portion is in the first position to support one or more packaging containers positioned thereon; and
 a second configuration wherein the first support portion is in the second position to allow the belt transport arrangement to transport the packaging containers,
 wherein the first support portion is moveable from the first position to the second position to bring the packaging containers into engagement with the contacting surfaces of the first pair of belts.

Suitably, there is provided a packaging apparatus which comprises:
 (I) a support platform for supporting packaging containers positioned thereon, the support platform comprising a first support portion moveable between a first position and a second position;
 (II) a packaging container positioning apparatus for positioning packaging containers on the support platform, the packaging container positioning apparatus comprising:
 one or more rails that each form a path for conveying devices;
 a plurality of individually controllable conveying devices comprising at least a first conveying device and a second conveying device, each conveying device mounted on one of the rails for moving along the path; and
 a control system configured to control the conveying devices;
 wherein the control system is configured to control each conveying device to: engage a packaging container, move along the path in a first conveying direction, and release the packaging container, to position the packaging container on the support platform; and
 (III) a belt transport arrangement for transporting packaging containers away from the support platform in a first transport direction;
 the belt transport arrangement comprising a first belt arrangement comprising a pair of belts, the pair of belts defining opposing contacting surfaces for contacting packaging containers;
 the apparatus being operable between:
 a first configuration wherein the support portion is in the first position to support one or more packaging containers positioned thereon; and
 a second configuration wherein the support portion is in the second position and contacting surfaces of the belts engage the one or more packaging containers.

The belt transport arrangement may comprise any feature as described in relation to the belt transport arrangement of the packaging apparatus of the first aspect.

The support platform may comprise any feature as described in relation to the support platform of the packaging apparatus of the first aspect.

The packaging container positioning apparatus may comprise any feature as described in relation to the packaging container positioning apparatus of the of the packaging apparatus first aspect.

The apparatus may be configured to perform the method of the fourth aspect. The apparatus may comprise an apparatus according to the first aspect and may be configured to perform the method of the second aspect.

According to a fourth aspect of the present invention there is provided a method of packaging using a packaging apparatus according to the third aspect, the method comprising bringing packaging containers into contact with the contacting surfaces of the belts; and transporting the packaging containers away from the support platform in the first transport direction.

In this way, a method of packaging may be provided that facilitates the transport of packaging containers using a belt transport arrangement, rather than transfer arms, this may advantageously readily accommodate packaging containers of varying shapes and sizes and provide high throughput.

Suitably, the method comprises packaging containers being conveyed onto the support platform one by one and being transported from the support platform, suitably to a sealing station as a batch of two or more.

According to a fifth aspect of the present invention there is provided a packaging container positioning apparatus for positioning packaging containers on a support platform, the packaging container positioning apparatus comprising:
one or more rails that each form a path for conveying devices; and
a plurality of individually controllable conveying devices comprising at least a first conveying device and a second conveying device, each conveying device mounted on a rail for moving along the path.

Suitably, the packaging container positioning apparatus further comprises a control system configured to control the conveying devices, wherein the control system is configured to control each conveying device to: engage a packaging container, move along the path in a first conveying direction, and release the packaging container, to position the packaging container on the support platform.

Suitably, the packaging container positioning apparatus comprises:
two rails that each form a path for conveying devices; and
a plurality of individually controllable conveying devices comprising at least a first conveying device and a second conveying device, each conveying device mounted on one of the rails for moving along the path.

The packaging container positioning apparatus may comprise any feature as described in relation to the packaging container positioning apparatus of the of the packaging apparatus of the first aspect.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1.1 shows a packaging apparatus;

FIG. 1.2 shows an enlarged view of a region of the packaging apparatus of FIG. 1.1;

FIG. 1.3 shows an enlarged view of a region of the packaging apparatus of FIG. 1.1;

FIG. 1.4 shows an alternative belt transport arrangement for a packaging apparatus;

FIG. 1.5 shows the belt transport arrangement of FIG. 1.4 in a packaging apparatus;

FIG. 1.6 shows a top view of a support platform in a packaging apparatus;

FIGS. 2.1 to 2.13 show the operation of the packaging apparatus of FIG. 1;

FIG. 3.1 shows a perspective view of a plurality of engaging members of an alternative embodiment;

FIG. 3.2 shows a front view of the engaging members of FIG. 3.1;

DETAILED DESCRIPTION OF PREFERRED EMBODIMENTS

Figure 4:
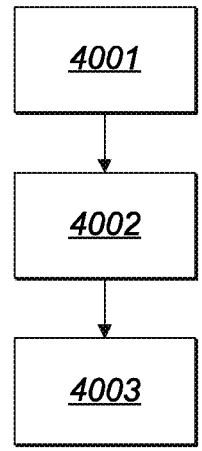
FIG. 4 shows a method of positioning packaging containers.

Referring to FIGS. 1.1 and 1.2, a packaging apparatus 1 comprises a support platform 100 for supporting packaging containers 10 positioned thereon. The packaging apparatus 1 further comprises a packaging container positioning apparatus 200 for positioning packaging containers on the support platform 100.

The packaging container positioning apparatus 200 comprises a first rail 202 and a second rail 204. The packaging container positioning apparatus 200 further comprises a plurality of individually controllable conveying devices 300. As best shown in FIG. 1.2, in this exemplary embodiment, the plurality of conveying devices 300 comprises a first set of conveying devices 302 having a first, second and third conveying device 302a, 302b, 302c, and a second set of conveying devices 304 having a first, second and third conveying device 304a, 304b, 304c.

The first rail 202 and second rail 204 each form a path for the conveying devices 300. The first set of conveying devices 302 are mounted on the first rail 202, for moving along the path formed by the first rail 202. The second set of conveying devices 304 are mounted on the second rail 204, for moving along the path formed by the second rail 204.

The packaging apparatus 1 further comprises an infeed assembly 500 comprising a first infeed belt 502a and a second infeed belt 502b. The second infeed belt 502b is arranged in use to receive packaging containers 10 from the first infeed belt 502a. In an alternative embodiment (not illustrated) the infeed assembly comprises a single infeed belt.

The packaging container positioning apparatus 200 further comprises a control system 400. The control system 400 is configured to control the conveying devices 300. As will later be described in greater detail in relation to FIGS. 2.1 to 2.13, the control system 400 is configured to control each of the plurality of conveying devices 300 to: engage a packaging container 10, move along the path in a first conveying direction, and release the packaging container 10, to position the packaging container 10 on the support platform 100. The control system 400 incorporates a sensor arrangement at the infeed assembly 500 and a computer system. The sensor arrangement is arranged to sense the presence of packaging containers, and thus allow the control system 400 to establish the presence of packaging containers for collection at the infeed assembly 500.

The first conveying direction is indicated in FIG. 1.1 by arrow 50. The first conveying direction is the direction in which the conveying devices 300 are configured to convey packaging containers 10. In the exemplary embodiment illustrated in the figures, the first conveying direction 50 is from left to right, parallel to centre line A-A, upstream to downstream.

The packaging apparatus 1 further comprises a sealing station 600 in which packaging containers are adapted to be held for a period of time whilst they are sealed. The sealing station comprises a sealing tool 602.

The packaging apparatus 1 further comprises an outfeed assembly comprising outfeed belt 700.

The first infeed belt 502a, second infeed belt 502b, support platform 100, sealing tool 602 of the sealing station 600, and outfeed belt 700 are all linearly aligned such that centre line A-A is a centre line of all of the aforementioned components of the packaging apparatus 1.

In this exemplary embodiment, the first rail 202 and second rail 204 are both linear and parallel to one another. The first rail 202 and second rail 204 are spaced apart either side of the infeed assembly 500 and support platform 100, equidistant from the centre line A-A. The first rail 202 and second rail 204 extend the length of the second infeed belt 502b and support platform 100. In this way, the packaging container positioning apparatus 200 is configured so that the conveying devices 300 can be moved into position to engage a packaging container 10 on the second infeed belt 502 of the infeed assembly 500, move along the path to transport the packaging container 10 from the infeed assembly 500 to the support platform 100, and release the packaging container 10 in position on the support platform 100.

The packaging apparatus 1 further comprises a belt transport arrangement 800 for transporting packaging containers 10 away from the support platform 100 in a first transport direction. The first transport direction is indicated in FIG. 1.1 by arrow 52. The first transport direction is the direction in which the belt transport arrangement 800 is configured to transport packaging containers. In the exemplary embodiment illustrated in the figures, the first transport direction 52 is from left to right, parallel to centre line A-A, upstream to downstream, and is parallel to the first conveying direction 50.

The belt transport arrangement 800 comprises a first belt region 802 comprising a first pair of belts 802a, 802b. The first pair of belts define opposing contacting surfaces for contacting packaging containers. The first pair of belts are spaced apart either side of the support platform, equidistant from the centre line A-A. The first pair of belts 802a, 802b extend the length of the support platform. The first pair of belts 802a, 802b are vertically positioned such that when the conveying devices transport packaging containers 10 from the infeed assembly 500 to the support platform 100, the conveying devices pass over (that is, clear, and are not obstructed by) the top of the first pair of belts 802a, 802b.

The first pair of belts 802a, 802b are adjustable to adjust the separation between the contacting surfaces of the first pair of belts 802a, 802b. The first pair of belts 802a, 802b are moveable in tandem such that the first pair of belts 802a, 802b remain equidistant from the centre line A-A during the adjustment.

The support platform 100 is configured to support packaging containers 10 at a first height when received from the conveying devices 300 and to lower to a second height for the packaging containers 10 to be taken up by the belt transport arrangement 800. The support platform 100 comprises adjustable height support portions 102 each moveable between a first position and a second position. The first position is a position in which the support portion is raised, and the second position is a position in which the support portion is lowered.

As shown in greater detail in the side view of the support platform 100 of FIG. 1.3, in this exemplary embodiment, the support platform 100 comprises a plurality of support portions 102a-102h. The height of each support portion is individually adjustable. In this exemplary embodiment, eight support portions are provided. In an alternative embodiment (not illustrated) the support platform 100 comprises a single support portion. In further embodiments (not illustrated) the support platform contains an alternative number of portions, for example two portions, three portions, and so on.

Each of the plurality of support portions 102a-102h is moveable between the first position and the second position. The support platform is configurable in a first configuration wherein the support portions 102a-102h are in the first position to support one or more packaging containers positioned thereon. The support platform is further configurable in a second configuration wherein support portions 102a-102h are in the second position to allow the belt transport arrangement 800 to transport the packaging containers. The support portions 102a-102h are moveable from the first position to the second position to bring the packaging containers 10 into contact with the contacting surfaces of the first pair of belts 802a, 802b. That is, by lowering the support portions, packaging containers 10 supported thereon are brought into contact with the contacting surfaces of the first pair of belts 802a, 802b. When the support portions reach the second position, the packaging containers 10 are no longer supported by the support portions, as the packaging containers have been taken-up by the belts 802a, 802b. In other words, in such a configuration, the packaging containers 10 are supported by the first pair of belts 802a, 802b and are no longer supported by the first support portion 102, which has dropped away beneath the packaging containers 10.

The support portions 102a-102h are moveable from the second position to the first position (that is, raisable) in a phased manner. In an exemplary embodiment, the support portion 102h closest to the second infeed belt 502b, can be first raised from the second position to the first position, followed by the adjacent support portion 102g, and so on. In this manner, the whole support region may be brought from the second position to the first position in a phased, or "wave-like", manner. As will become clear from the description of operation which follows, this has advantages in apparatus throughput.

The support platform 100 is configured to cycle between: a first configuration wherein each of the support portions is in the first, raised, position, to support one or more packaging containers 10 positioned thereon; and a second configuration wherein each of the support portions is in the second, lowered, position to allow the belt transport arrangement 800 to transport the packaging containers.

In the cycle of the illustrated embodiment the support portions simultaneously move from the first configuration to the second configuration and return from the first configuration to the first configuration one by one.

The support platform 100 is thus repeatedly configurable in the first and second configurations with a number of intermediate configurations.

The belt transport arrangement 800 further comprises a second belt region 804 comprising a second pair of belts 804a, 804b. The second belt region 804 is arranged to receive packaging containers 10 from the first belt region 802. The second pair of belts 804a, 804b define opposing contacting surfaces for contacting packaging containers. The second belt region 804 is provided downstream of the first belt region 802 along the first transport direction 52.

The second pair of belts 804a, 804b are spaced apart either side of the sealing station 600, either side from the centre line A-A. The second pair of belts 804a, 804b extend the length of the sealing station 600 and project beyond the start of the outfeed belt 700. The second pair of belts 804a, 804b are vertically aligned with the first pair of belts 802a, 802b.

The second pair of belts 804a, 804b are adjustable to adjust the separation between the contacting surfaces of the second pair of belts 804a, 804b. The second pair of belts 804a, 804b are moveable in tandem such that the second pair of belts remain equidistant from the centre line A-A during the adjustment.

The second belt region 804 is configurable in a first configuration wherein the separation between the contacting surfaces of the second pair of belts 804a, 804b is substantially the same as the separation between the contacting surfaces of the first pair of belts 802a, 802b. In this way, the second belt region 804 can smoothly receive packaging containers 10 from the first belt region 802 and transport the packaging containers into the sealing station 600.

The second belt region 804 is further configurable in a second configuration wherein the separation between the contacting surfaces of the second pair of belts 804a, 804b is greater than the separation between the contacting surfaces of the first pair of belts. In this way, the second belt region may release, or drop-off, packaging containers 10 at the sealing tool 602 of the sealing station 600 by increasing the separation between the second pair of belts 804a, 804b so that the packaging containers are released into the sealing tool 602.

The belts of the first and second belt regions 802, 804 have an adjustable draft angle, which may be adjusted to correspond to the draft angle of packaging containers 10 which are to be positioned and transported. In this way, the contacting surfaces are flush with the sides of packaging containers 10 that are to be transported, providing for secure and stable transportation.

In another exemplary embodiment, an alternative belt transport arrangement 850 may be provided, as shown in FIG. 1.4. The belt transport arrangement 850 can take the place of the belt transport arrangement 800 previously described. The belt transport arrangement 850 comprises a belt arrangement comprising a first belt region 852 and a second belt region 854. A single belt 856 extends across the first belt region 852 and second belt region 854. The first and second belt regions are moveable to adjust the separation between the contacting surfaces, in a similar manner to that described in relation to the adjustable separation between belts 804a, 804b of the belt transport arrangement 500. However, in this embodiment, the belt is a single, continuous, belt.

In FIG. 1.5, the alternative belt transport arrangement 850 is shown installed in the packaging apparatus 100. The alternative belt transport arrangement 850 comprises first belt 856a and second belt 856b. As shown, the belts 856a, 856b each extend the length of the support platform 100, the length of the sealing tool 602, and project beyond the start of the outfeed belt 700.

FIG. 1.6 shows the first set of conveying devices 302 in greater detail. The first set of conveying devices 302 and second set of conveying devices 304 are structurally identical. As shown in FIG. 1.2, and also in greater detail in FIG. 1.6, each conveying device 300 comprises an engaging member 306, an arm 308, and a housing 310. The engaging member 306 comprises a pair of jaws. The engaging member 306 is mounted on the arm 308 such that the jaws extend away from the arm. When the conveying devices 300 are mounted on the respective rail, the jaws open toward the centre line A-A. The vertical position of the jaws is adjustable by adjusting the vertical position at which the engaging member 306 is mounted on the arm 308. In this way, packaging containers 10 of different heights may be accommodated by the packaging apparatus 1.

The housing 310 of each conveying device 300 houses two electromechanical linear actuators. The first actuator is arranged to drive the conveying device 300 along the path formed by the respective rail 202, 204. The second actuator is arranged to drive the arm 308, thereby to move the engaging member 306 toward or away from the centre line A-A, as required. In this way, the engaging member 306 is moveable between a first, retracted, position, in which the engaging member 306 is proximal to the housing, and away from the centre line A-A, and a second, extended position, in which the engaging member 306 is extended away from the housing 310, and toward the centre line A-A.

In the first, retracted, position, the engaging member is retracted to allow packaging containers 10 to pass along the second infeed belt 502b between the conveying devices 300, and in the second, extended, position, the engaging member 306 can extend to engage a packaging container 10 on the second infeed belt 502b. The engaging member can subsequently be retracted back to the first position to release the packaging container 10. In use, movement between the first and second positions facilitates engagement and release of a packaging container.

The operation of the packaging apparatus 1 is best illustrated by FIGS. 2.1 to 2.13 which show the sequential operation of the packaging apparatus 1 as packaging containers 10 are positioned on the support platform 100 and transported away therefrom.

As shown in FIG. 2.1, packaging containers 10 (10a to 10d labelled) are present on the infeed assembly. The packaging containers 10 are roughly spaced by the differential operational speed of the first infeed belt 502a and second infeed belt 502b. The second infeed belt 502b carries the packaging containers along. The outfeed belt 700 rotates in readiness to transport packaging containers away from the packaging apparatus 1.

As shown in FIG. 2.2, when the first packaging container 10a reaches the first conveying device 302a of the first set of conveying devices 302, the control system 400 controls the first conveying device 302a to engage the first packaging container 10a. The engaging member 306 is moved from the retracted position to the extended position to engage the first packaging container 10a.

As shown in FIG. 2.3, the control system 400 then controls the first conveying device to move along the path in the first conveying direction 50, thereby conveying the first packaging container 10a in said direction. In doing so, the first packaging container 10a is slid along the support platform. The first conveying device is moved to position the first packaging container 10a on the support platform. In this exemplary embodiment, the first conveying device is moved to position the first packaging container 10a on the support portion farthest from the second infeed belt, that is, support portion 102a.

As shown in FIG. 2.4, the control system 400 then controls the first conveying device to release the first packaging container 10*a*. The first packaging container 10*a* is thereby left in position on the support portion 102*a*. In order to facilitate close-spaced positioning of the packaging containers 10 (which may be necessary for particular sealing tools 602), following release of the first packaging container 10*a*, the control system 400 controls the first conveying device to adjust its position to accommodate an incoming second conveying device, which involves a small additional movement in the first conveying direction 50.

As shown in FIGS. 2.3 and 2.4, the second conveying device 302*b* is controlled to engage and move the second packaging container 10*b* to position the container on the last available support portion, that is, support portion 102*b*. The second conveying device 302*b* is controlled to engage, move and release in the same manner as described in relation to the control of the first conveying device 302*a*.

As shown in FIG. 2.5, having released the second packaging container 10*b* at support portion 102*b* the second conveying device 302*b* makes a similar small additional movement in the first conveying direction 50 to accommodate an incoming third conveying device 302*c*.

As shown in FIG. 2.6, all conveying devices of the first set 302 are used to position packaging containers 10*a*, 10*b*, 10*c*, before the second set of conveying devices 304 are employed.

As shown in FIGS. 2.6 to 2.9, the second set of conveying devices 304 are controlled to engage, move and position packaging containers 10*d*, 10*e*, 10*f* in an identical manner to that described in relation to the first set of conveying devices 302.

As is also shown in FIGS. 2.6 to 2.8, whilst the second set of conveying devices 304 convey packaging containers 10*d*, 10*e*, 10*f*, the control system 400 controls the first set of conveying 302 devices to return to their original position, in readiness to engage subsequent packaging container containers 10*g*, 10*h* on the second infeed belt.

As shown in FIGS. 2.9 to 2.11, once the second set of conveying devices have positioned packaging containers 10*d*, 10*e*, 10*f*, the first set of conveying devices are again employed to position packaging containers 10*g*, 10*h* on the last available support portions 102*g*, 102*h*. The control system 400 controls the second set of conveying devices 304 to return to their original position, in readiness to engage subsequent containers, in a later repeat of the process. Eight packaging containers 10*a*-10*h* are now positioned on the eight support portions 102*a*-102*h*.

As also shown in FIG. 2.11, once the final container 10*h* is positioned, the separation between the first pair of belts 802*a*, 802*b* is reduced slightly, as indicated by arrows 54, to bring the contacting surfaces closer to the packaging containers. The separation between the second pair of belts 804*a*, 804*b* is also reduced, as indicated by arrows 56. In this described and illustrated example, a plurality of packaging containers 12 (previously conveyed to the sealing station) were sealed in the sealing station whilst the packaging containers 10*a*-10*h* were being positioned on the support platform.

The positioned packaging containers 10*a*-10*h* are then to be transported into the sealing station 600. Simultaneously, sealed containers 12 are to be transported away from the sealing station 600.

The support portions 102*a*-102*h* simultaneously move from the first position to the second position. That is, all support portions drop away into the lowered position. In doing so, the packaging containers 10*a*-10*h* are brought into contact with the contacting surfaces of the first pair of belts 802*a*, 802*b*. The first pair of belts 802*a*, 802*b* then transport the packaging containers away from the support platform in the first transport direction 52 and pass the packaging containers 10 to the second pair of belts 804*a*, 804*b*. The second pair of belts 804*a*, 804*b* transport the packaging containers 10*a*-10*h* into the sealing station 600.

Once the packaging containers 10*a*-10*h* are clear of a support portion 102*a*-102*h* it can be moved from the second position back to the first position. As shown in FIGS. 2.12 and 2.13, this allows a further set of packaging containers to be slid across the support platform surface in a substantial repeat of the process described above. In that case though it is the second set of conveying devices 304 that move the first of the containers of that set whilst the first conveying devices 302 return to their original position.

As mentioned above, the support portions 102*a*-102*h* are moveable from the second position to the first position in a phased manner. The support portion 102*h* closest to the second infeed belt 502*b* is the first to be returned to the first position, followed by the next closest support portion 102*g*, and so on. In this manner, the control system 400 need not wait for all of the first set of packaging containers 10 to clear the support platform 100 before returning the support portions to the first position. Instead, in this manner, the control system 400 can control the conveying devices 300 to engage and slide a packaging container of a second set along the raised support portions before downstream support portions are raised, thus allowing conveyance of the second set of packaging containers before the first set of packaging containers are fully clear of the downstream support portions.

Whilst the description of the operation of the packaging apparatus 1 given above refers to belt transport arrangement 800, in another exemplary embodiment, an alternative belt transport arrangement 850 is employed. In this embodiment, the operation of the conveying devices 300 is identical to that described above. The operation of the alternative belt transport arrangement 850 is functionally similar to that of belt transport arrangement 800.

In an operational step corresponding to that shown in FIG. 2.11, once the final container 10*h* is positioned, the separation between the belts 856 in the first belt region 852 is reduced to bring the opposing contacting surfaces of the belts 856 in the first belt region 852 closer to the packaging containers. The separation between the belts 856 in the second belt region 854 is also reduced, to reduce the separation between the opposing contacting surfaces of the belts 856 in the second belt region 854.

In an identical manner to that described above, the positioned packaging containers are then to be transported into the sealing station 600. The lowering of the support portions 102*a*-102*h* brings the packaging container 10*a*-10*h* into contact with the contacting surfaces of the belts 856 in the first belt region 852. The single, continuous, belts 856 are driven to transport the packaging containers 102*a*-102*h* into the sealing station 600. The belts in the second belt region 854 are then moved away from one another (not shown) so as to position them out of the way during a sealing operation in the sealing station.

Referring to FIGS. 3.1 and 3.2, views of a plurality of engaging members 406 of an alternative embodiment are shown. The engaging members 406 are suitable for use in the conveying devices 300 as described above and, in use, are intended to replace engaging members 306. Each engaging member 406 comprises a pair of jaws. Each engaging member 406 is mountable on an arm 308 (as shown in FIG. 1.2) by a bracket 407 such that the jaws extend away from the arm 308. When the conveying devices 300 are mounted on the respective rail, the jaws open toward the centre line A-A. The jaws of the engaging members 406 are arranged to be able to overlap in a horizontal direction by an amount O (that is, a direction parallel to the centre-line A-A, which is parallel to the first conveying direction 50) when the conveying devices 300 are brought into proximity with one another. To facilitate this, the jaws of adjacent engaging members are vertically displaced relative to one another by an amount D. As shown in the figures, the jaws of engaging member 406a are vertically displaced above the jaws of adjacent engaging member 406b. Similarly, the jaws of engaging member 406c are vertically displaced above the jaws of adjacent engaging member 406b. In this way, the jaws of the engaging member 406 may overlap in the horizontal direction. The engaging members are thus arranged such that engaging members 406a 406c travel in the first conveying direction in a plane which is vertically displaced from that of engaging member 4b. In this exemplary embodiment, the vertical displacement of the jaws is determined by the length of the portion of the bracket 407 which extends from the attachment with the respective arm. Here, said length of the portion of the bracket of engaging member 406a is shorter than the length of the bracket 407 of adjacent engaging member 406b.

The advantage of such a construction may be best understood in relation to FIG. 2.4 where the system uses a first conveying device and a second conveying device each employing engaging members 406. Following positioning of a packaging container 10a, when the first conveying device releases the packaging container 10a leaving it in position on the support platform, the first conveying device need not adjust its position in order to accommodate the incoming second conveying device. Rather than adjust its position, the jaws of the engaging member 406b of the incoming second conveying device are able to pass under the jaws of the engaging member 406a of the first conveying device. It will be understood by the person skilled in the art that this arrangement is particularly beneficial where the width of the packaging containers to be positioned (and thus the with of the jaws) is greater than the width of the housing 310 of the conveying devices 300.

FIG. 4 outlines a method of positioning packaging containers on a support platform using a plurality of individually controllable conveying devices comprising at least a first conveying device and a second conveying device, each conveying device being mounted on a rail for moving along a path formed by the rail. Step 4001 comprises engaging a packaging container using a conveying device. Step 4002 comprises moving the conveying device along the path in a first conveying direction. Step 4003 comprises releasing the packaging container, thereby positioning the packaging container on the support platform.

Figure 5:
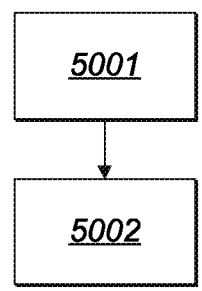
FIG. 5 shows a method of packaging.

FIG. 5 outlines a method of packaging using a packaging apparatus having a support platform and belt transport arrangement. Step 5001 comprises bringing packaging containers into contact with the contacting surfaces of the belts. Step 5002 comprises transporting the packaging containers away from the support platform in the first transport direction.

In the illustrated embodiments the packaging apparatus comprises: (a) a packaging container positioning apparatus comprising a plurality of individually controllable conveying devices; (b) a support platform comprising a support portion moveable between a first position and a second position; and (c) a belt transport arrangement for transporting packaging containers away from the support platform. In further alternative embodiments (not illustrated) there are provided packaging apparatus which comprise: feature (a) without features (b) or (c); features (a) and (b) without feature (c); and features (b) and (c) without feature (a). Such alternate embodiments may still enjoy many advantages though the combination of features (a), (b) and (c) may be most advantageous.

Although a few preferred embodiments of the present invention have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A packaging apparatus comprising:
a support platform for supporting packaging containers positioned thereon; and
a packaging container positioning apparatus for positioning packaging containers on the support platform,
the packaging container positioning apparatus comprising:
one or more rails that each form a path for conveying devices;
a plurality of individually controllable conveying devices comprising at least a first conveying device and a second conveying device, each conveying device mounted on a rail for moving along the path; and
a control system configured to control the conveying devices,
wherein the control system is configured to control each conveying device to: engage a packaging container, move along the path in a first conveying direction, and release the packaging container, to position the packaging container on the support platform; and
a belt transport arrangement for transporting packaging containers away from the support platform in a first transport direction and wherein the belt transport arrangement comprises a pair of belts, the pair of belts defining opposing contacting services for contacting packaging containers.

2. The packaging apparatus according to claim 1 comprising an infeed assembly, the control system being configured to control each conveying device to engage the packaging container at the infeed assembly.

3. The packaging apparatus according to claim 2 wherein the infeed assembly comprises an infeed belt and optionally wherein the control system is configured to control the conveying devices to match the speed and/or acceleration of the infeed belt.

4. The packaging apparatus according to claim 1 wherein each conveying device comprises an engaging member moveable between a first, retracted, position and a second, extended, position, facilitating engagement and release of the packaging container.

5. The packaging apparatus according to claim 1 wherein the one or more rails are a pair of spaced apart rails on which the conveying devices are mounted, at least one conveying device being mounted on each rail.

6. The packaging apparatus according to claim 1 wherein the control system is configured to:
control the first conveying device to:
engage the packaging container, move in the first conveying direction along the path, and release the packaging container; and, at least partly simultaneously,
control the second conveying device to:
release another packaging container, move in a second conveying direction along the path, opposite to the first conveying direction, and engage another packaging container.

7. The packaging apparatus according to claim 1 wherein the belt transport arrangement comprises:
(i) a first belt region for contacting packaging containers for transporting packaging containers away from the support platform; and
(ii) a second belt region, downstream of the first belt region, for transporting packaging containers away from the first belt region.

8. The packaging apparatus according to claim 7 wherein the belt transport arrangement comprises a pair of belts which extend across both the first belt region and the second belt region, and wherein:
(i) the separation of the belts is adjustable in the first belt region; and
(ii) the separation of the belts is adjustable in the second belt region; and
the adjustment of the separation of the belts in either region is independent of the adjustment of the separation in the other.

9. The packaging apparatus according to claim 7 further comprising:
a sealing station
wherein the belt transport arrangement is configurable to transport containers into the sealing station.

10. A packaging apparatus comprising:
a support platform for supporting packaging containers positioned thereon; and
a packaging container positioning apparatus for positioning packaging containers on the support platform,
the packaging container positioning apparatus comprising:
one or more rails that each form a path for conveying devices;
a plurality of individually controllable conveying devices comprising at least a first conveying device and a second conveying device, each conveying device mounted on a rail for moving along the path; and
a control system configured to control the conveying devices,
wherein the control system is configured to control each conveying device to: engage a packaging container, move along the path in a first conveying direction, and release the packaging container, to position the packaging container on the support platform, wherein the support platform comprises an adjustable height portion.

11. The packaging apparatus according to claim 1 wherein each conveying device comprises an engaging member which comprises a pair of jaws and wherein jaws of adjacent engaging members are arranged to be able to overlap in the first conveying direction.

12. The packaging apparatus according to claim 10 wherein the support platform comprises a plurality of support portions of individually adjustable height.

* * * * *